(12) United States Patent
Katsumata et al.

(10) Patent No.: US 11,394,943 B2
(45) Date of Patent: Jul. 19, 2022

(54) IMAGE PROCESSING APPARATUS AND METHOD, FILE GENERATION APPARATUS AND METHOD, AND PROGRAM

(71) Applicant: SONY CORPORATION, Tokyo (JP)

(72) Inventors: Mitsuru Katsumata, Tokyo (JP); Mitsuhiro Hirabayashi, Tokyo (JP); Kazuhiko Takabayashi, Tokyo (JP); Toshiya Hamada, Saitama (JP); Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 44 days.

(21) Appl. No.: 16/609,305

(22) PCT Filed: May 16, 2018

(86) PCT No.: PCT/JP2018/018842
§ 371 (c)(1),
(2) Date: Oct. 29, 2019

(87) PCT Pub. No.: WO2018/221211
PCT Pub. Date: Dec. 6, 2018

(65) Prior Publication Data
US 2020/0059635 A1 Feb. 20, 2020

(30) Foreign Application Priority Data
May 30, 2017 (JP) .............................. JP2017-106233

(51) Int. Cl.
*G06T 15/00* (2011.01)
*H04N 13/111* (2018.01)
(Continued)

(52) U.S. Cl.
CPC .............. *H04N 13/111* (2018.05); *G06T 5/50* (2013.01); *G06T 15/205* (2013.01); *G06T 19/00* (2013.01);
(Continued)

(58) Field of Classification Search
CPC .............. H04N 13/243; H04N 21/816; H04N 21/26258; H04N 13/161; H04N 21/21805;
(Continued)

(56) References Cited

U.S. PATENT DOCUMENTS 6,002,430 A 12/1999 McCall et al.
9,451,298 B2 * 9/2016 Yamagishi ....... H04N 21/21805
(Continued)

FOREIGN PATENT DOCUMENTS

RU 2143718 C1 12/1999

OTHER PUBLICATIONS

Geng J. Three-dimensional display technologies. Advances in optics and photonics. Dec. 31, 2013;5(4):456-535.*
(Continued)

*Primary Examiner* — Phu K Nguyen
(74) *Attorney, Agent, or Firm* — Paratus Law Group, PLLC

(57) ABSTRACT

There is provided an image processing apparatus and method, a file generation apparatus and method, and a program that enable a suitable occlusion image to be obtained. The image processing apparatus includes an MPD file processing unit configured to select an occlusion image to be acquired, on the basis of information regarding a viewpoint position of the occlusion image included in an MPD file, from among a plurality of the occlusion images indicated by the MPD file. The present technology can be applied to a client device.

21 Claims, 25 Drawing Sheets

(51) Int. Cl.
- *H04N 13/128* (2018.01)
- *H04N 13/194* (2018.01)
- *H04N 13/161* (2018.01)
- *H04N 13/243* (2018.01)
- *G06T 5/50* (2006.01)
- *G06T 15/20* (2011.01)
- *G06T 19/00* (2011.01)

(52) U.S. Cl.
CPC ......... *H04N 13/128* (2018.05); *H04N 13/161* (2018.05); *H04N 13/194* (2018.05); *H04N 13/243* (2018.05)

(58) Field of Classification Search
CPC ....... H04N 21/44029; H04N 21/85406; H04N 13/111; H04N 13/128; H04N 21/8456; H04N 13/194; G06T 19/00; G06T 5/50; G06T 15/205
USPC ........................................................ 345/418
See application file for complete search history.

(56) References Cited

U.S. PATENT DOCUMENTS

| | | | | |
|---|---|---|---|---|
| 9,618,747 | B2* | 4/2017 | Villmer | G06F 3/012 |
| 10,127,714 | B1* | 11/2018 | Kvaalen | G06T 19/20 |
| 10,192,185 | B2* | 1/2019 | Tomii | G06Q 50/02 |
| 10,225,546 | B2* | 3/2019 | Gupte | H04N 13/178 |
| 10,261,749 | B1* | 4/2019 | Wilcox | G06F 3/165 |
| 10,547,879 | B2* | 1/2020 | Lai | H04N 21/845 |
| 10,595,069 | B2* | 3/2020 | Swaminathan | H04L 65/605 |
| 10,620,441 | B2* | 4/2020 | Van Der Auwera | H04N 17/004 |
| 10,687,043 | B2* | 6/2020 | Lee | H04N 19/597 |
| 10,805,614 | B2* | 10/2020 | D'Acunto | H04N 21/8456 |
| 10,805,650 | B2* | 10/2020 | Wang | H04N 21/4825 |
| 10,819,645 | B2* | 10/2020 | Westphal | H04N 21/44209 |
| 10,841,566 | B2* | 11/2020 | He | H04N 21/234345 |
| 10,846,820 | B2* | 11/2020 | Takahashi | H04N 21/2353 |
| 10,873,737 | B1* | 12/2020 | Kim | H04N 7/0102 |
| 10,880,535 | B2* | 12/2020 | Oh | H04N 21/81 |
| 10,897,646 | B2* | 1/2021 | Di | H04N 21/4348 |
| 10,965,928 | B2* | 3/2021 | Lee | H04N 13/194 |
| 11,044,455 | B2* | 6/2021 | Oh | H04N 13/178 |
| 2014/0189772 | A1 | 7/2014 | Yamagishi et al. | |

OTHER PUBLICATIONS

3Dvista, Tutorial: How to set hotspots that link to another panorama using 3DVista Virtual Tour, Sep. 8, 2014; https://www.youtube.com/watch?v=lkobj8rgxCw&list=RDCMUCalalqLU0cYvTrc-3rKms1w&index=15.*

Roundaa, Bring your 360 photos alive with interactive hotspots, Aug. 30, 2016, https://www.youtube.com/watch?v=qhD4oX4k0fk.*

Su T, Sobhani A, Yassine A, Shirmohammadi S, Javadtalab A. A DASH-based HEVC multi-view video streaming system. Journal of Real-Time Image Processing. Aug. 2016;12(2):329-42.*

3Dvista, Tutorial: Adding Floor Plans to Virtual Tours with 3DVista, May 13, 2016, https://www.youtube.com/watch?v=J6DbmVopmqU.*

Ma H, Liu J, Hu Z, Qiu H, Xu D, Wang Z, Gong X, Yang S. A Method of Generating Measurable Panoramic Image for Indoor Mobile Measurement System. arXiv preprint arXiv:2010.14270. Oct. 27, 2020.*

Mar. 3, 2020, European Search Report issued for related EP Application No. 18809776.0.

Grüneberg et al., D5.1—File Format Specification and 3D Video Codec, Information and Communication Technologies (ICT) Programme, Jul. 5, 2011, pp. 1-38.

* cited by examiner

FIG. 4

```
<MPD>
<Period>
  // texture INFORMATION OF MAIN IMAGE
  <AdaptationSet mime-type="video/mp4">
    <Representation id="vt1" bandwidth="1024000"><BaseURL>main_texture1.mp4</BaseURL></Representation>  → Q11
  </AdaptationSet>

// depth INFORMATION OF MAIN IMAGE
  <AdaptationSet mime-type="video/mp4">
    <EssentialProperty schemeIdUri="urn:mpeg:dash:depth:2015">
    <Representation id="vd1" associationId="vt1"><BaseURL>main_depth1.mp4</BaseURL></Representation>  → Q12
  </AdaptationSet>

// texture INFORMATION OF OCCLUSION IMAGE 1
  <AdaptationSet mime-type="video/mp4">
    <EssentialProperty schemeIdUri="urn:mpeg:dash:occlusion:2015">
    <Representation id="vot1"><BaseURL>occlusion1_texture.mp4</BaseURL></Representation>  → Q13
  </AdaptationSet>

// depth INFORMATION OF OCCLUSION IMAGE 1
  <AdaptationSet mime-type="video/mp4">
    <EssentialProperty schemeIdUri="urn:mpeg:dash:depth:2015">
    <Representation id="vod1" associationId="vot1"><BaseURL>occlusion1_depth.mp4</BaseURL></Representation>  → Q14
  </AdaptationSet>

// texture INFORMATION OF OCCLUSION IMAGE 2
  <AdaptationSet mime-type="video/mp4">
    <EssentialProperty schemeIdUri="urn:mpeg:dash:occlusion:2015">
    <Representation id="vot2"><BaseURL>occlusion2_texture.mp4</BaseURL></Representation>  → Q15
  </AdaptationSet>

// depth INFORMATION OF OCCLUSION IMAGE 2
  <AdaptationSet mime-type="video/mp4">
    <EssentialProperty schemeIdUri="urn:mpeg:dash:depth:2015">
    <Representation id="vod2" associationId="vot2"><BaseURL>occlusion2_depth.mp4</BaseURL></Representation>  → Q16
  </AdaptationSet>
</Period>
</MPD>
```

FIG. 5

```
<MPD>
 <Period>
  // texture INFORMATION OF MAIN IMAGE
  <AdaptationSet mime-type="video/mp4">
   <Representation id="vt1" bandwidth="1024000"><BaseURL>main_texture1.mp4</BaseURL></Representation>
  </AdaptationSet>

// depth INFORMATION OF MAIN IMAGE
  <AdaptationSet mime-type="video/mp4">
   <EssentialProperty schemeIdUri="urn:mpeg:dash:depth:2015">
   <Representation id="vd1" associationId="vt1"><BaseURL>main_depth1.mp4</BaseURL></Representation>
  </AdaptationSet>
                                                                                  Q21
  // texture INFORMATION OF OCCLUSION IMAGE 1
  <AdaptationSet mime-type="video/mp4">
   <EssentialProperty schemeIdUri="urn:mpeg:dash:occlusion:2017" value="0,0,0,1">
   <Representation id="vot1" associationId="vot1"><BaseURL>occlusion1_texture.mp4</BaseURL></Representation>
  </AdaptationSet>

// depth INFORMATION OF OCCLUSION IMAGE 1
  <AdaptationSet mime-type="video/mp4">
   <EssentialProperty schemeIdUri="urn:mpeg:dash:depth:2015">
   <Representation id="vod1" associationId="vot1"><BaseURL>occlusion1_depth.mp4</BaseURL></Representation>
  </AdaptationSet>
                                                                                  Q22
  // texture INFORMATION OF OCCLUSION IMAGE 2
  <AdaptationSet mime-type="video/mp4">
   <EssentialProperty schemeIdUri="urn:mpeg:dash:occlusion:2017" value="0,0,0,2">
   <Representation id="vot2" associationId="vot2"><BaseURL>occlusion2_texture.mp4</BaseURL></Representation>
  </AdaptationSet>

// depth INFORMATION OF OCCLUSION IMAGE 2
  <AdaptationSet mime-type="video/mp4">
   <EssentialProperty schemeIdUri="urn:mpeg:dash:depth:2015">
   <Representation id="vod2" associationId="vot2"><BaseURL>occlusion2_depth.mp4</BaseURL></Representation>
  </AdaptationSet>
 </Period>
</MPD>
```

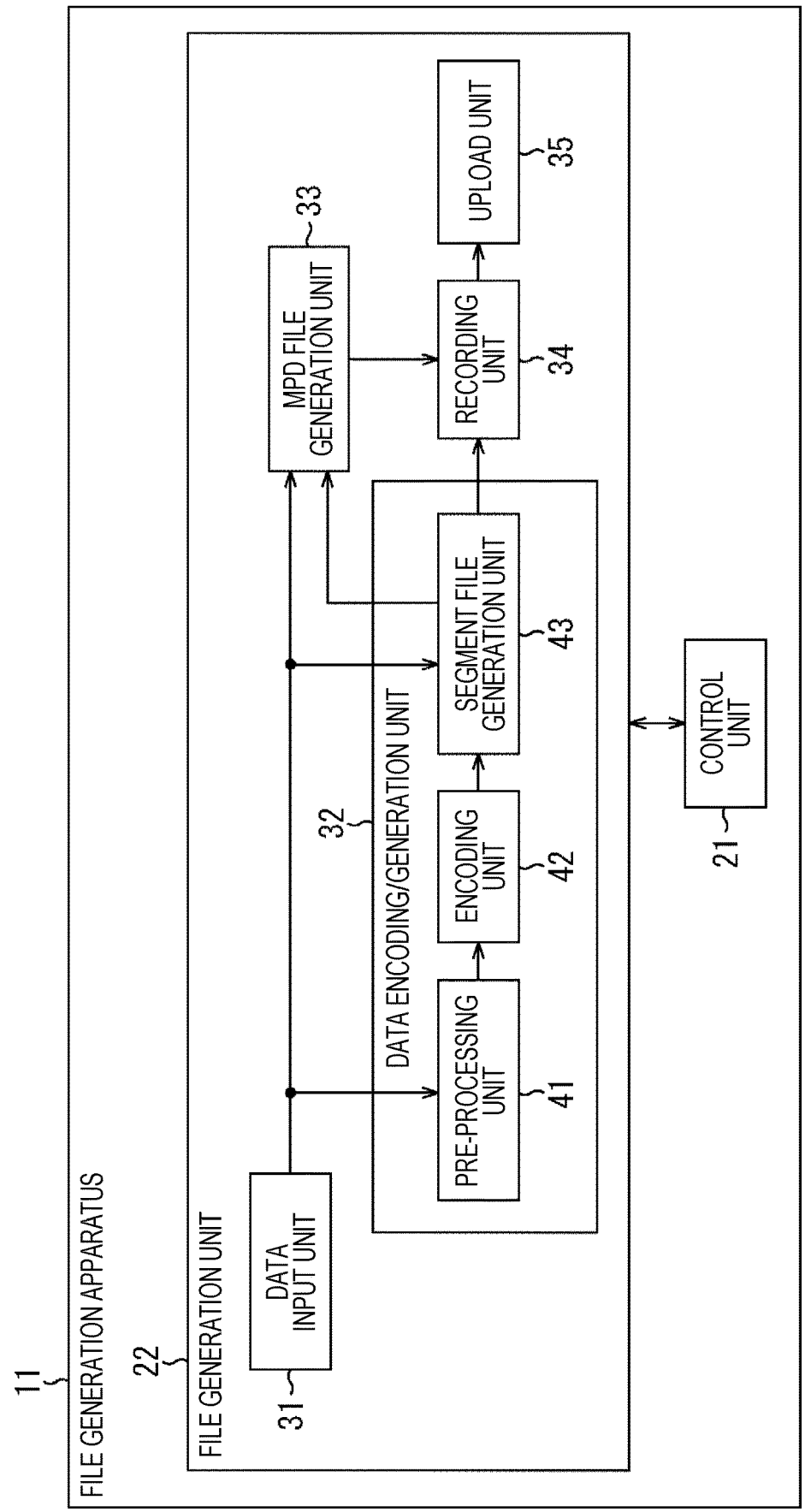

FIG. 13

| SELECTION INFORMATION flag | SELECTION INFORMATION VALUE |
|---|---|
| 00 | depth level VALUE IS INDICATED |
| 01 | depth AVERAGE VALUE IS INDICATED |
| 10 | ONLY OCCLUSION DIRECTION INFORMATION IS INDICATED (x, y, z, -x, -y, -z) |
| 11 | OCCLUSION DIRECTION INFORMATION AND OCCLUSION DISTANCE INFORMATION ARE INDICATED |

FIG. 14

```
<MPD>
<Period>
  // texture INFORMATION OF MAIN IMAGE
  <AdaptationSet mime-type="video/mp4">
    <Representation id="vt1" bandwidth="1024000"><BaseURL>main_texture1.mp4</BaseURL></Representation>
  </AdaptationSet>

// depth INFORMATION OF MAIN IMAGE
  <AdaptationSet mime-type="video/mp4">
    <EssentialProperty schemeIdUri="urn:mpeg:dash:depth:2015">
    <Representation id="vd1" associationId="vt1"><BaseURL>main_depth1.mp4</BaseURL></Representation>
  </AdaptationSet>

// texture INFORMATION OF OCCLUSION IMAGE 1
  <AdaptationSet mime-type="video/mp4">
    <EssentialProperty schemeIdUri="urn:mpeg:dash:occlusion:2017" value="00,1">      Q31
    <Representation id="vot1" associationId="vt1"><BaseURL>occlusion1_texture.mp4</BaseURL></Representation>
  </AdaptationSet>

// depth INFORMATION OF OCCLUSION IMAGE 1
  <AdaptationSet mime-type="video/mp4">
    <EssentialProperty schemeIdUri="urn:mpeg:dash:depth:2015">
    <Representation id="vod1" associationId="vot1"><BaseURL>occlusion1_depth.mp4</BaseURL></Representation>
  </AdaptationSet>

// texture INFORMATION OF OCCLUSION IMAGE 2
  <AdaptationSet mime-type="video/mp4">
    <EssentialProperty schemeIdUri="urn:mpeg:dash:occlusion:2017" value="00,2">      Q32
    <Representation id="vot2" associationId="vt1"><BaseURL>occlusion2_texture.mp4</BaseURL></Representation>
  </AdaptationSet>

// depth INFORMATION OF OCCLUSION IMAGE 2
  <AdaptationSet mime-type="video/mp4">
    <EssentialProperty schemeIdUri="urn:mpeg:dash:depth:2015">
    <Representation id="vod2" associationId="vot2"><BaseURL>occlusion2_depth.mp4</BaseURL></Representation>
  </AdaptationSet>
</Period>
</MPD>
```

FIG. 16

| 6-DIRECTION NOTATION | yaw ANGLE | pitch ANGLE |
|---|---|---|
| x | 90 | 0 |
| y | 0 | -90 |
| z | 0 | 0 |
| -x | -90 | 0 |
| -y | 0 | 90 |
| -z | -180 | 0 |

FIG. 17

| SELECTION INFORMATION flag | SELECTION INFORMATION VALUE |
|---|---|
| 1000 | PRIORITY flag IS INDICATED |
| 1001 | PRIORITY ORDER IS INDICATED |

FIG. 19

| SELECTION INFORMATION flag | SELECTION INFORMATION VALUE |
|---|---|
| 000 | depth level VALUE AND PRIORITY flag ARE INDICATED BY SEPARATING BY SPACE |
| 001 | depth level VALUE AND PRIORITY ORDER ARE INDICATED BY SEPARATING BY SPACE |
| 010 | depth AVERAGE VALUE AND PRIORITY flag ARE INDICATED BY SEPARATING BY SPACE |
| 011 | depth AVERAGE VALUE AND PRIORITY ORDER ARE INDICATED BY SEPARATING BY SPACE |
| 100 | OCCLUSION DIRECTION INFORMATION AND PRIORITY flag ARE INDICATED BY SEPARATING BY SPACE (x, y, z, -x, -y, -z) |
| 101 | OCCLUSION DIRECTION INFORMATION AND PRIORITY ORDER ARE INDICATED BY SEPARATING BY SPACE (x, y, z, -x, -y, -z) |
| 110 | OCCLUSION DIRECTION INFORMATION, OCCLUSION DISTANCE INFORMATION, AND PRIORITY flag ARE INDICATED BY SEPARATING BY SPACE |
| 111 | OCCLUSION DIRECTION INFORMATION, OCCLUSION DISTANCE INFORMATION, AND PRIORITY ORDER ARE INDICATED BY SEPARATING BY SPACE |

FIG. 20

| SELECTION INFORMATION flag | SELECTION INFORMATION VALUE |
|---|---|
| 10000 | VIEWPOINT POSITION MAXIMUM VALUE INFORMATION<br>IT IS INDICATED THAT THIS VALUE IS MAXIMUM DISTANCE FROM ORIGIN IN WHICH SUITABLE DISPLAY IS POSSIBLE, IN CASE OF USING OCCLUSION IMAGE.<br>IT IS NOT DESIRED TO DISPLAY IN CASE OF USING THIS VALUE WITH THIS VIEWPOINT POSITION OR FARTHER. |

FIG. 21

| SELECTION INFORMATION flag | SELECTION INFORMATION VALUE |
|---|---|
| 10000 | depth level VALUE AND VIEWPOINT POSITION MAXIMUM VALUE INFORMATION ARE INDICATED BY SEPARATING BY SPACE |
| 10001 | depth AVERAGE VALUE AND VIEWPOINT POSITION MAXIMUM VALUE INFORMATION ARE INDICATED BY SEPARATING BY SPACE |
| 10010 | OCCLUSION DIRECTION INFORMATION AND VIEWPOINT POSITION MAXIMUM VALUE INFORMATION ARE INDICATED BY SEPARATING BY SPACE (x, y, z, −x, −y, −z) |
| 10011 | OCCLUSION DIRECTION INFORMATION, OCCLUSION DISTANCE INFORMATION, AND VIEWPOINT POSITION MAXIMUM VALUE INFORMATION ARE INDICATED BY SEPARATING BY SPACE |

FIG. 22

```
aligned(8) class QualityMetricsSampleEntry() extends MetadataSampleEntry('vqme') {
    QualityMetricsConfigurationBox();
} aligned(8) class QualityMetricsConfigurationBox
    extends FullBox('vqmC',version=0, 0) {
    unsigned int(8) field_size_bytes;
    unsigned int(8) metric_count;
    for(i=1;i<=metric_count;i++) {
        unsigned int(32) metric_code;
    }
}
```

FIG. 23

| field name | semantics |
|---|---|
| field_size_bytes | size PER ONE PIECE OF Quality INCLUDED IN sample IN CASE WHERE SIZE OF metric IS SMALLER THAN field_size_bytes, padding IS INCLUDED |
| metric_count | NUMBER OF PIECES OF INCLUDED Quality |
| metric_code | TYPE OF Quality CURRENTLY DETERMINED<br>'psnr':Peak Signal to Noise Ratio (PSNR)<br>'ssim':SSIM<br>'msim':MS-SSIM<br>'j144':VQM(ITU-T Recommendation. j144)<br>'j247':PEVQ(ITU-T Recommendation. j247)<br>'mops':MOS<br>'fsig':Frame significance(FSIG) |

FIG. 24

| | metric_code | bytes |
|---|---|---|
| PRIORITY flag OF OCCLUSION IMAGE | 'ocpf' | 8bit<br>0: NOT PRIORITIZED<br>1: PRIORITIZED<br>others reserved |
| PRIORITY ORDER OF OCCLUSION IMAGE | 'ocpn' | unsigned 8bit integer |

FIG. 25

```
<MPD>
<Period>
    // texture INFORMATION OF MAIN IMAGE
    <AdaptationSet mime-type="video/mp4">
        <Representation id="vt1" bandwidth="1024000"><BaseURL>main_texture1.mp4</BaseURL></Representation>
    </AdaptationSet>
    // depth INFORMATION OF MAIN IMAGE
    <AdaptationSet mime-type="video/mp4">
        <EssentialProperty schemeIdUri="urn:mpeg:dash:depth:2015">
        <Representation id="vd1" associationId="vt1"><BaseURL>main_depth1.mp4</BaseURL></Representation>
    </AdaptationSet>
    // texture INFORMATION OF OCCLUSION IMAGE 1
    <AdaptationSet mime-type="video/mp4">
        <EssentialProperty schemeIdUri="urn:mpeg:dash:occlusion:2015">
        <Representation id="vot1" associationId="vt1"><BaseURL>occlusion1_texture.mp4</BaseURL></Representation>
    </AdaptationSet>
    // Quality INFORMATION OF PRIORITY OF OCCLUSION IMAGE 1
    <AdaptationSet mime-type="application/mp4" codecs="vqme.ocpn">
        <Representation id="voq1" associationId="vot1"><BaseURL>occlusion1_quality.mp4</BaseURL></Representation>  ← Q51
    </AdaptationSet>
    // depth INFORMATION OF OCCLUSION IMAGE 1
    <AdaptationSet mime-type="video/mp4">
        <EssentialProperty schemeIdUri="urn:mpeg:dash:depth:2015">
        <Representation id="vod1" associationId="vot1"><BaseURL>occlusion1_depth.mp4</BaseURL></Representation>
    </AdaptationSet>
    // texture INFORMATION OF OCCLUSION IMAGE 2
    <AdaptationSet mime-type="video/mp4">
        <EssentialProperty schemeIdUri="urn:mpeg:dash:occlusion:2015">
        <Representation id="vot2" associationId="vt1"><BaseURL>occlusion2_texture.mp4</BaseURL></Representation>
    </AdaptationSet>
    // Quality INFORMATION OF PRIORITY OF OCCLUSION IMAGE 2
    <AdaptationSet mime-type="application/mp4" codecs="vqme.ocpn">
        <Representation id="voq2" associationId="vot2"><BaseURL>occlusion2_quality.mp4</BaseURL></Representation>  ← Q52
    </AdaptationSet>
    // depth INFORMATION OF OCCLUSION IMAGE 2
    <AdaptationSet mime-type="video/mp4">
        <EssentialProperty schemeIdUri="urn:mpeg:dash:depth:2015">
        <Representation id="vod2" associationId="vot2"><BaseURL>occlusion2_depth.mp4</BaseURL></Representation>
    </AdaptationSet>
</Period>
</MPD>
```

IMAGE PROCESSING APPARATUS AND METHOD, FILE GENERATION APPARATUS AND METHOD, AND PROGRAM

CROSS REFERENCE TO PRIOR APPLICATION

This application is a National Stage Patent Application of PCT International Patent Application No. PCT/JP2018/018842 (filed on May 16, 2018) under 35 U.S.C. § 371, which claims priority to Japanese Patent Application No. 2017-106233 (filed on May 30, 2017), which are all hereby incorporated by reference in their entirety.

TECHNICAL FIELD

The present technology relates to an image processing apparatus and method, a file generation apparatus and method, and a program, and particularly relates to an image processing apparatus and method, a file generation apparatus and method, and a program that are made capable of obtaining a suitable occlusion image.

BACKGROUND ART

Conventionally, a full spherical image is known that is an omnidirectional image (video) of 360 degrees in each direction, that is, a horizontal direction and a vertical direction.

In reproduction of the full spherical image, it is possible to experience viewing of an image (video) viewed from the center of the full sphere, by using only texture information. Furthermore, using depth information in addition to the texture information to reproduce the full spherical image can realize stereoscopic vision and motion parallax of a video. This operation allows movement of a subject to become closer to a real movement, and can improve realistic feeling to prevent motion sickness. Hereinafter, in particular, image information including the texture information and the depth information of the full spherical image is also referred to as a main image.

Furthermore, in reproduction of the full spherical image, in addition to the experience of looking around from the center (hereinafter also referred to as an origin O) of the full sphere, it is possible to perform display of looking-in in which a viewpoint position of a user as a viewer/listener is moved from the origin O, by using an occlusion image in addition to the main image.

Here, the occlusion image is image information including: texture information of an occlusion region, which is a region of the subject that does not exist in the texture information of the main image with viewpoint position being the origin O, that is, a subject not visible from the origin O; and depth information indicating a position (distance) in a depth direction regarding the occlusion region.

For example, in moving picture experts group phase-dynamic adaptive streaming over HTTP (MPEG-DASH), it is possible to transmit the main image and the occlusion image as described above to a client device (see, for example, Non-Patent Document 1).

In particular, in the MPEG-DASH, a plurality of occlusion images can be transmitted, and the client device can realize display of looking-in by using a suitable occlusion image according to a viewpoint position of the user among the plurality of the acquired occlusion images.

CITATION LIST

Non-Patent Document

Non-Patent Document 1: ISO/IEC 23009-1 Information technology-Dynamic adaptive streaming over HTTP (DASH)-Part 1: Media presentation description and segment formats, April 2012

SUMMARY OF THE INVENTION

Problems to be Solved by the Invention

However, with the above-described technology, there has been a case where it is not possible to obtain a suitable occlusion image on the client device.

For example, in the MPEG-DASH, when a transmission band is not sufficient, the client device acquires either the main image or only the texture information of the main image, without acquiring the occlusion image.

In this case, even when the transmission band has an allowance for acquiring only some occlusion image to be used for displaying the full spherical image among the plurality of occlusion images, the client device cannot acquire the occlusion image. Therefore, there has been a case where the client device cannot acquire a necessary occlusion image depending on a state of the transmission band, and cannot perform display of looking-in.

The present technology has been made in view of such a situation, and makes it possible to obtain a suitable occlusion image.

Solutions to Problems

The image processing apparatus according to a first aspect of the present technology includes an MPD file processing unit configured to select an occlusion image to be acquired, on the basis of information regarding a viewpoint position of an occlusion image included in an MPD file, from among a plurality of the occlusion images indicated by the MPD file.

An image processing method or program according to the first aspect of the present technology includes a step of selecting an occlusion image to be acquired, on the basis of information regarding a viewpoint position of an occlusion image included in an MPD file, from among a plurality of the occlusion images indicated by the MPD file.

In the first aspect of the present technology, on the basis of information regarding a viewpoint position of the occlusion image included in an MPD file, the occlusion image to be acquired is selected from among a plurality of the occlusion images indicated by the MPD file.

A file generation apparatus according to a second aspect of the present technology includes: an MPD file generation unit configured to generate an MPD file including information regarding a viewpoint position of an occlusion image for a plurality of the occlusion images; and a communication unit to send the MPD file.

A file generation method or program according to the second aspect of the present technology includes the steps of: generating an MPD file including information regarding a viewpoint position of an occlusion image for a plurality of the occlusion images; and sending the MPD file.

In the second aspect of the present technology, an MPD file including information regarding a viewpoint position of an occlusion image is generated for a plurality of the occlusion images, and the MPD file is sent.

Effects of the Invention

According to the first and second aspects of the present technology, a suitable occlusion image can be obtained.

It is to be noted that the effects described herein are not necessarily limited, and any of the effects described in the present disclosure is possible.

BRIEF DESCRIPTION OF DRAWINGS

FIG. 4 is a view showing an example of an MPD file.

FIG. 5 is a view showing an example of the MPD file.

FIG. 6 is a diagram showing a configuration example of a file generation apparatus.

FIG. 13 is a table showing an example of a selection information flag and a selection information value.

FIG. 14 is a view showing an example of the MPD file.

FIG. 16 is a table for explaining notation of the occlusion direction information.

FIG. 17 is a table showing an example of the selection information flag and the selection information value.

FIG. 19 is a table showing an example of the selection information flag and the selection information value.

FIG. 20 is a table showing an example of the selection information flag and the selection information value.

FIG. 21 is a table showing an example of the selection information flag and the selection information value.

FIG. 22 is a view for explaining signaling of Quality information.

FIG. 23 is a view for explaining signaling of the Quality information.

FIG. 24 is a view for explaining signaling of the Quality information.

FIG. 25 is a view showing an example of the MPD file.

MODE FOR CARRYING OUT THE INVENTION

Figure 1:
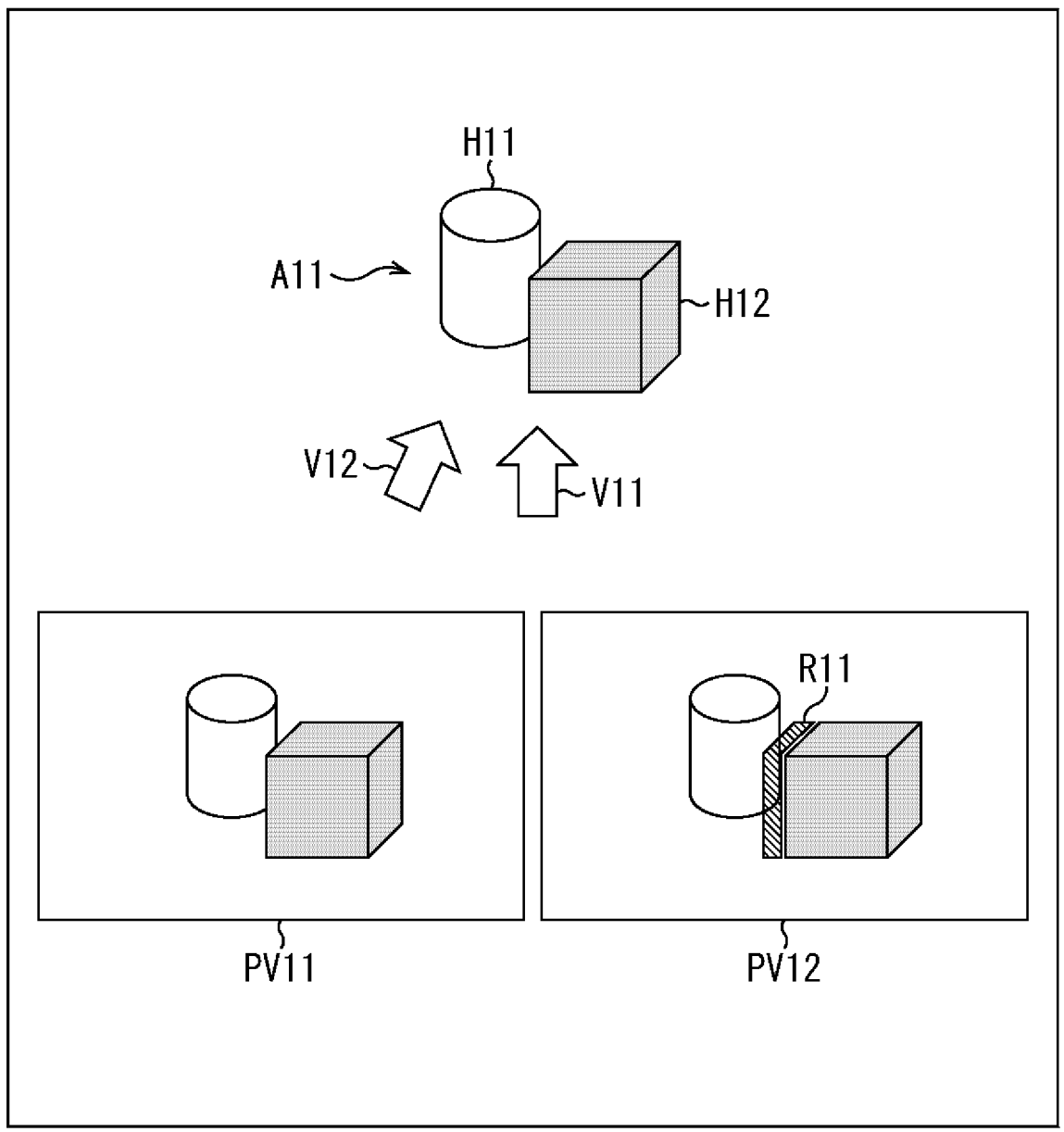
FIG. 1 is a view for explaining occlusion.

Hereinafter, embodiments to which the present technology is applied will be described with reference to the drawings.

First Embodiment

<About Present Technology>

The present technology is to enable a client device to obtain some suitable occlusion image even in a case where a transmission band is not sufficient for transmitting all the occlusion images, in distributing a plurality of occlusion images in addition to a main image in distribution of a full spherical image using MPEG-DASH.

In particular, here, it becomes possible to select a suitable occlusion image on the client device by simultaneously signaling coordinate information indicating a viewpoint position of the occlusion image and information regarding a depth level of an occlusion region, to the client device.

Note that, in the following, a description is given to an example in which a media presentation description (MPD) file includes: information for selecting an occlusion image, such as coordinate information indicating a viewpoint position of the occlusion image; and information regarding a depth level of the occlusion region.

However, without limiting to a method of signaling information for selecting an occlusion image with the MPD file, information for selecting an occlusion image may be signaled to the client device in any other method. For example, the server or the like may supply only information for selecting an occlusion image to the client device separately from the MPD file.

Now, the present technology will be described below. Note that a description is given on assumption that a full spherical image is a moving image here, but the full spherical image may be a still image. Furthermore, the image to be processed in the present technology is not limited to an omnidirectional image, but may be some image of an omnidirectional image and the like, such as a hemispherical image.

First, a main image includes texture information, which is a moving image as a full spherical image, and depth information of the full spherical image.

The full spherical image reproduced by the texture information of the main image is to be an omnidirectional image and the like of, for example, 360 degrees in each direction, that is, in a horizontal direction and a vertical direction viewed from the origin O, in a predetermined coordinate system (hereinafter, also referred to as a full spherical coordinate system).

Here, at a start of reproduction of the full spherical image, a position of the origin O is a center position of a full sphere, which is a virtual screen of the full spherical image, and a viewpoint position of a user who views (watches) the full spherical image, that is, a center position of the user's head, is to be at the origin O.

Furthermore, the depth information of the main image is information indicating a distance from the origin O to a position of a subject in each region on the full spherical image (texture information), that is, information indicating a position in a depth direction of each subject of the full spherical image.

Next, looking-in display and the occlusion image will be described.

For example, as indicated by arrow A11 in FIG. 1, there are a cylinder H11 and a cube H12 as subjects of the full spherical image in a space, and an image obtained by image-capturing the cylinder H11 and the cube H12 from a direction indicated by arrow V11 is to be the texture information of the main image. Furthermore, the texture information obtained by the image capturing and depth information to be obtained for the texture information are to be encoded as the main image.

In this case, as the texture information of the main image, a texture image PV11 shown in the lower left in the figure is obtained as the texture information of the main image.

Now, it is assumed that a user viewing the cylinder H11 and the cube H12 from the origin O, that is, in the direction of arrow V11 slightly changes the viewpoint position to a position on the left side in the figure from the origin O, and views the cylinder H11 and the cube H12 so as to look-in from a direction of arrow V12, that is, from the left side.

In this case, it is considered to generate, on the basis of the main image, a full spherical image viewed from the viewpoint after movement of the user, that is, viewed from the direction of arrow V12.

For example, an image (texture information) when the cylinder H11 and the cube H12 are viewed from the direction of arrow V12 is a texture image PV12 shown in the lower right in the figure. That is, in a case where the user looks in from the left side and views the cylinder H11 and the cube H12, those subjects should appear as shown in the texture image PV12.

In the texture image PV12, a hatched region R11 is a region including information of a subject that cannot be obtained from the texture image PV11, which is texture information of the main image, and this region is the occlusion region.

In other words, the region R11 on the texture image PV12 is a region that cannot be seen behind another subject or the like in the direction of arrow V11, and does not exist on the texture image PV11.

As described above, the information of the region R11, which is the occlusion region, is not included in the texture image PV11, which is the texture information of the main image, and in the depth information of the main image.

Therefore, when the texture image PV12 viewed from the direction indicated by arrow V12 is generated by using only the main image, the information of a portion of the region R11, which is the occlusion region, is lost. Therefore, for example, the client device can display the occlusion region in black, or predict pixel values of pixels in the occlusion region by using pixel information in the vicinity of the occlusion region, but the image obtained in such a manner is to be an image in which the actual subject does not appear, which causes a sense of discomfort.

Therefore, by generating, as an occlusion image, an image of texture information and depth information including information of at least a portion of the occlusion region, it becomes possible to correctly display the occlusion region that is to be lost only with the main image, by using not only the main image but also the occlusion image. With this operation, it is possible to display an image with high realistic feeling even when performing looking-in display, that is, when displaying a full spherical image with a position different from the origin O as the viewpoint position of the user.

For example, in the example shown in FIG. 1, when a viewpoint position corresponding to the direction indicated by arrow V12 is the viewpoint position of the occlusion image (hereinafter also referred to as an origin O'), the texture image PV12 itself can be taken as the texture information of the occlusion image.

In such a case, the occlusion image is to be image information including: the texture image PV12 as texture information; and depth information indicating a distance in a depth direction corresponding to the subject at each position on the texture image PV12.

Note that the texture information of the occlusion image may be an omnidirectional full spherical image when the viewpoint position is the origin O', such as the texture image PV12, or may be an image of only the portion of the region R11 that is an occlusion region. That is, the texture information of the occlusion image is only required to include at least image information (texture information) of the occlusion region.

Furthermore, the origin O', which is the viewpoint position of the occlusion image, may be the same as the origin O of the full spherical coordinate system in some cases.

Figure 2:
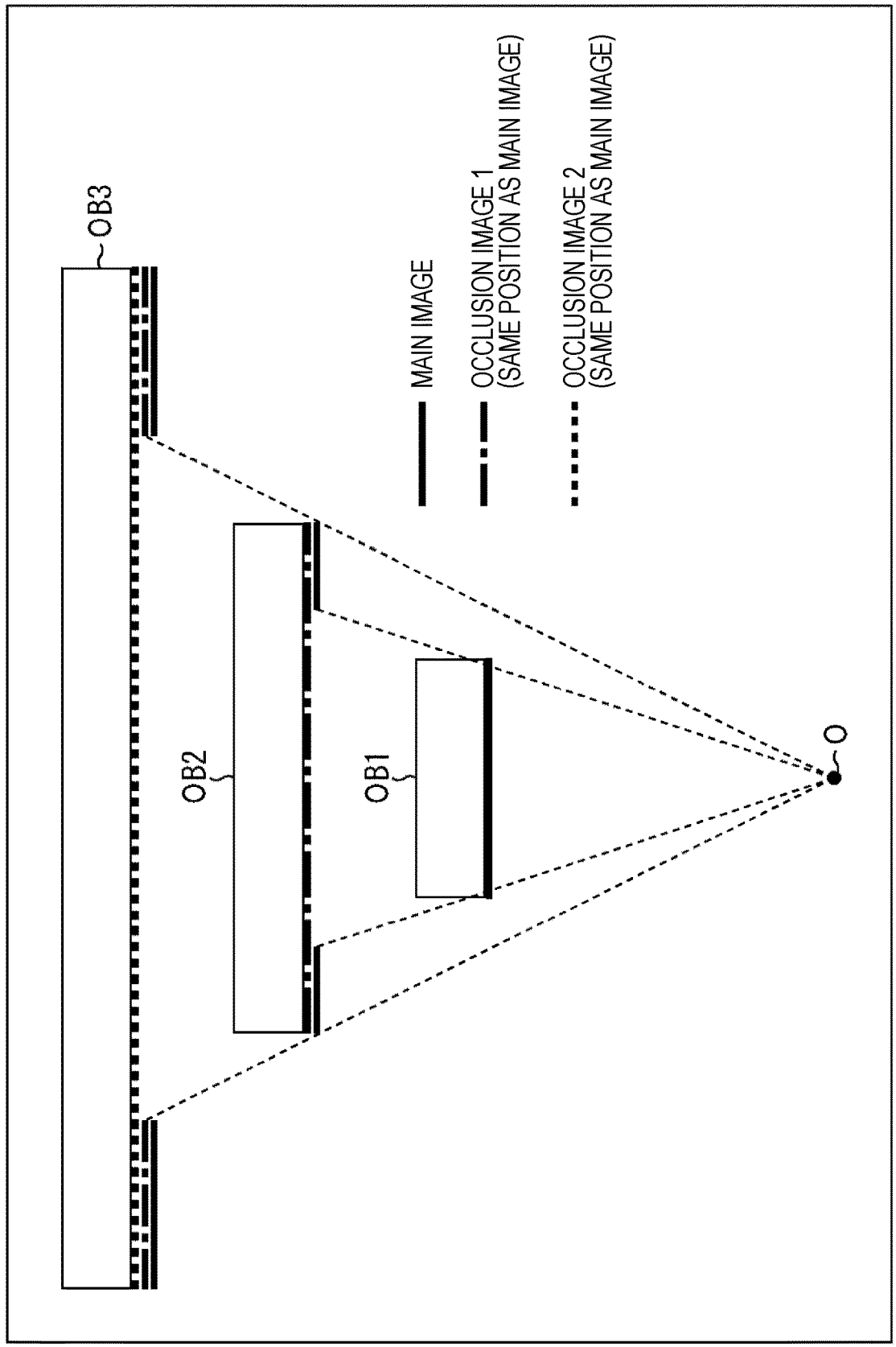
FIG. 2 is a view for explaining an occlusion image.

For example, as shown in FIG. 2, it is assumed that there are an object OB1, an object OB2, and an object OB3 in a space.

In this example, when viewed from the origin O of the full spherical coordinate system, a partial region of the object OB2 is hidden by the object OB1 and invisible, and a partial region of the object OB3 is hidden by the object OB1 and the object OB2 and invisible.

In such a case, for example, the texture information of the main image is an image captured with the origin O as the viewpoint position in a state where the objects OB1 to OB3 are present.

Therefore, the texture information of the obtained main image is in a state where, although the objects OB1 to OB3 appear as subjects, a partial region of the object OB2 and a partial region of the object OB3 are hidden and invisible.

Furthermore, an image obtained by image capturing with the origin O as the origin O' in a state where the object OB1 is absent is to be texture information of an occlusion image 1.

In this case, the texture information of the occlusion image 1 is in a state where the object OB1 does not appear as a subject, and the entire region of the object OB2 and a partial region of the object OB3 are visible. In other words, a partial region of the object OB3 is in a state of being hidden by the object OB2 and invisible.

The texture information of such an occlusion image 1 includes, as occlusion region information, information of a partial region of the object OB2 that is not included in the texture information of the main image.

Moreover, an image obtained by image capturing with the origin O as the origin O' in a state where the object OB1 and the object OB2 are absent is to be texture information of an occlusion image 2.

In this case, the texture information of the occlusion image 2 is in a state where the object OB1 and the object OB2 do not appear as subjects, and the entire region of the object OB3 is visible.

The texture information of such an occlusion image 2 includes, as occlusion region information, information of a partial region of the object OB3 that is not included in the texture information of the main image and the occlusion image 1.

Note that, in more detail, the texture information of these occlusion image 1 and occlusion image 2 is generated on the basis of an image obtained by image-capturing the objects OB1 to OB3 with a plurality of mutually different positions as viewpoints, such as the origin O and another position different from the origin O. That is, the texture information of the occlusion image is generated on the basis of a plurality of images having mutually different viewpoint positions.

Meanwhile, there may be a case where there is a plurality of occlusion images for one main image.

As such an example, it may be considered a case where, for example, there is a plurality of occlusion images whose origin O' is each of a plurality of positions different from the origin O of the main image in the full spherical coordinate system. In this case, the plurality of these occlusion images includes, for example, information of a region that is invisible as a subject in the main image.

Furthermore, as another example in which there is a plurality of occlusion images for one main image, it may be considered a case where there is a plurality of occlusion images having the origin O' at a same position in the full spherical coordinate system.

In other words, for example, it may be considered a case where there is a plurality of occlusion images whose origin O' is a position of the origin O of the main image, and these occlusion images include information of a region that is an occlusion region in the main image. At this time, for example, as described with reference to FIG. 2, some occlusion images may include information of a region that is an occlusion region in another occlusion image.

In a case where there is a plurality of occlusion images for the main image, for example, operation in the following use cases are assumed.

Use Case U1

A case where there is only an occlusion image whose origin O' is a position of the origin O of the main image Use Case U2

A case where there is a plurality of occlusion images whose origin O' is a position other than the origin O of the main image, and the origins O' of individual occlusion images are at mutually different positions Use Case U3

A case where there are an occlusion image whose origin O' is a position of the origin O of the main image and an occlusion image whose origin O is a position other than the origin O', and there is a plurality of occlusion images only at the position of the origin O Use Case U4

A case where there are an occlusion image whose origin O' is a position of the origin O of the main image and an occlusion image whose origin O is a position other than the origin O', and there is a plurality of occlusion images at each of the position of the origin O and the position different from the origin O For example, in the use case U1, an occlusion image may not exist at a position other than the origin O, and a plurality of occlusion images may exist at the position of the origin O. Furthermore, in the use case U2, an occlusion image does not exist at the position of the origin O.

Moreover, for example, the use case U3 is a use case where the use case U1 and the use case U2 are combined.

Figure 3:
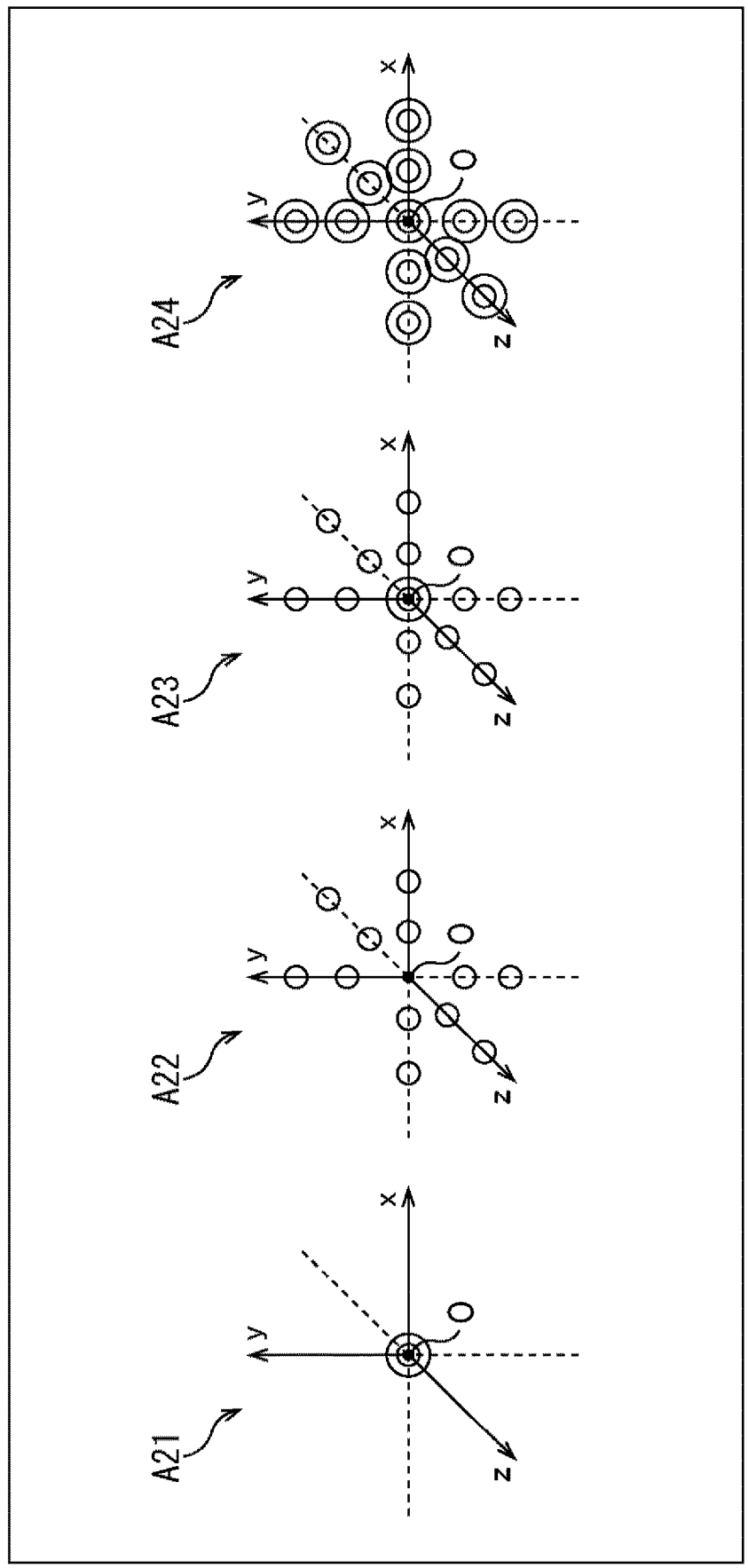
FIG. 3 is a view for explaining a position of an occlusion image.

As an example of these use cases U1 to U4, for example, an example shown in FIG. 3 can be considered. Note that, in FIG. 3, an x-axis, a y-axis, and a z-axis indicate axes of the full spherical coordinate system. Furthermore, although not shown here, the main image exists at the origin O of the full spherical coordinate system.

Moreover, a circle "○" in FIG. 3 indicates that there is one occlusion image whose viewpoint position (origin O') is a position of the circle. A double circle "⊙" indicates that there are two occlusion images whose origin O' is a position of the double circle.

For example, in the example indicated by arrow A21, two occlusion images exist at the position of the origin O at which the main image exists, and this example is the use case U1 described above.

Furthermore, in the example indicated by arrow A22, one occlusion image exists at each of a plurality of positions different from the origin O, and this example is the use case U2. In particular, here, the occlusion images exist at a plurality of positions on each axis of the x-axis, y-axis, and z-axis.

In the example indicated by arrow A23, two occlusion images exist at the position of the origin O, and one occlusion image exists at each of a plurality of positions different from the origin O on each axis of the x-axis, y-axis, and z-axis. That is, in the example indicated by arrow A23, there are both the occlusion image of the example indicated by arrow A21 and the occlusion image of the example indicated by arrow A22, and this example is the use case U3.

In the example indicated by arrow A24, two occlusion images exist at the position of the origin O, and two occlusion images also exist at each of a plurality of positions different from the origin O on each axis of the x-axis, y-axis, and z-axis. The example indicated by arrow A24 is the use case U4.

Now, consider a case of distributing the main image and the occlusion image to the client device by using MPEG-DASH.

As a specific example, for example, in the use case U1 described above, consider a case where there are two occlusion images at the origin O, and assume that there are the occlusion image 1 and the occlusion image 2 whose origin O' is the origin O, which is a viewpoint position.

Here, the occlusion image 1 is image information including information of a region that is an occlusion region in the main image. Furthermore, the occlusion image 2 is image information including information of a region that is an occlusion region in the main image and is also an occlusion region in the occlusion image 1.

As described above, the main image includes the texture information and the depth information of the main image, and similarly, the occlusion image 1 and the occlusion image 2 also include texture information and depth information of these occlusion images.

A file for obtaining the main image having such an occlusion image 1 and an occlusion image 2, that is, an MPD file including metadata of the main image, is to be, for example, as shown in FIG. 4.

FIG. 4 shows an example in the use case U1. In FIG. 4, information regarding the texture information (texture information) of the main image is described in a portion indicated by arrow Q11, while information regarding the depth information (depth information) of the main image is described in a portion indicated by arrow Q12.

Furthermore, information regarding the texture information of the occlusion image 1 is described in a portion indicated by arrow Q13, while information regarding the depth information of the occlusion image 1 is described in a portion indicated by arrow Q14.

Moreover, information regarding the texture information of the occlusion image 2 is described in a portion indicated by arrow Q15, while information regarding the depth information of the occlusion image 2 is described in a portion indicated by arrow Q16.

The portion indicated by each of arrows Q11 to 016 is one piece of AdaptationSet.

For example, in the portion indicated by arrow Q11, "vt1" is described as id of Representation of the texture information of the main image.

Similarly, in the portion indicated by arrow Q13, "vot1" is described as id of Representation of the texture information of the occlusion image 1. Further, in the portion indicated by arrow Q15, "vot2" is described as id of Representation of the texture information of the occlusion image 2.

Furthermore, in the portion indicated by arrow Q12, a portion indicated by arrow Q14, and the portion indicated by arrow Q16, which are portions related to the depth information, a portion of schemeIdUri in EssentialProperty of the MPEG-DASH is to be schemeIdUri="urn:mpeg:dash:depth:2015".

That is, in AdaptationSet of the depth information of each of the main image, the occlusion image 1, and the occlusion image 2, schemeIdUri is set to "urn:mpeg:dash:depth:2015". These descriptions of schemeIdUri allow the portion indicated by arrow Q12, the portion indicated by arrow Q14, and the portion indicated by arrow Q16 to be specified as being a description related to the depth information.

Furthermore, in Representation of the depth information, associationId is used to describe id of the texture information corresponding to the depth information, which makes it possible to specify which texture information the depth information corresponds to.

For example, the portion indicated by arrow Q12 describes associationId="vt1", and indicates a relation (association) between the texture information of the main image in the portion indicated by arrow Q11 and the depth information of the main image in the portion indicated by arrow Q12.

Similarly, for example, in the portion indicated by arrow Q14, id "vot1" described in the portion indicated by arrow Q13 is used to describe associationId="vot1", while in the portion indicated by arrow Q16, id "vot2" described in the portion indicated by arrow Q15 is used to describe associationId="vot2".

With these descriptions, the texture information and the depth information can be correctly specified for the main image, the occlusion image 1, and the occlusion image 2.

Moreover, whether the texture information is associated with the occlusion image is made distinguishable by setting the portion of schemeIdUri as "urn:mpeg:dash:occlusion:2015" in EssentialProperty, for example, as described in the portion indicated by arrow Q13 and the portion indicated by arrow Q15.

That is, schemeIdUri is set to "urn:mpeg:dash:occlusion:2015" in AdaptationSet of the texture information of each of the occlusion image 1 and the occlusion image 2. These descriptions of schemeIdUri allow the portion indicated by arrow Q13 and the portion indicated by arrow Q15 to be specified as being a description related to the texture information of the occlusion image.

Using the MPD file including the information regarding the occlusion image as described above enables the following implementation in client device in the MPEG-DASH. In other words, the following processes TR1 to TR3 can be executed.

Process TR1

All of the main image, the occlusion image 1, and the occlusion image 2 are acquired to reproduce a full spherical image Process TR2

Only the texture information and the depth information of the main image are acquired to reproduce a full spherical image Process TR3

Only the texture information of the main image is acquired to reproduce a full spherical image In this case, for example, in the process TR2, stereoscopic vision and motion parallax can be realized since the depth information of the main image is acquired, but an occlusion region cannot be correctly displayed when looking-in display is performed, since the occlusion image is not acquired.

Furthermore, in the process TR3, stereoscopic vision and motion parallax cannot be realized since the depth information of the main image is not acquired.

In a case where a transmission bandwidth between the self and a server that distributes the main image and the like is not sufficient, and all of the main image, the occlusion image 1, and the occlusion image 2 cannot be acquired from the server, the client device is to select either the process TR2 or the process TR3.

Specifically, the client device first measures the transmission band, and selects the texture information of the main image as the information to be acquired from the server.

Next, when there is a transmission band for acquiring the depth information of the main image on the basis of a measurement result of the transmission band, the client device also selects the depth information of the main image as the information to be acquired.

On the other hand, when the transmission band is not sufficient, the client device is to acquire only the texture information of the main image.

Furthermore, in a case where the client device selects the texture information and the depth information of the main image as the information to be acquired, it is determined whether or not there is a sufficient transmission band for acquiring the occlusion image 1 and the occlusion image 2 on the basis of the measurement result of the transmission band.

Then, in a case where it is determined that there is a sufficient transmission band, the client device selects, as the information to be acquired, the texture information and the depth information of each image of the main image, the occlusion image 1, and the occlusion image 2 as the information to be acquired from the server.

Furthermore, in a case where it is determined that there is not a sufficient transmission band, the client device selects, as the information to be acquired, the texture information and the depth information of the main image as the information to be acquired from the server.

When the information to be acquired from the server is this selected, the client device acquires the selected information from the server, and reproduces a full spherical image. With this operation, any one of the processes TR1 to TR3 described above is to be performed.

In particular, in a case where there is not a sufficient transmission band for acquiring the occlusion image 1 and the occlusion image 2, either the process TR2 or the process TR3 is performed.

However, depending on the transmission band, it may be possible to transmit either one of the occlusion image 1 or the occlusion image 2 in addition to the main image.

Furthermore, at a time of reproduction of the full spherical image, it is possible to use only some occlusion image among a plurality of occlusion images.

For example, if some occlusion image of the plurality of occlusion images includes occlusion region information necessary for displaying the full spherical image, it is only required to use only the occlusion image including the necessary information regarding the occlusion region.

Therefore, it is useful to selectively acquire and use only some occlusion image among a plurality of occlusion images.

In this example, since the occlusion image 2 includes occlusion region information that is not included in the occlusion image 1 as well, the occlusion image 1 is more useful in the occlusion image 1 and the occlusion image 2.

In other words, for example, it is assumed that the occlusion image 1 mentioned here is the occlusion image 1 described with reference to FIG. 2, and the occlusion image 2 is the occlusion image 2 described with reference to FIG. 2.

In this example, the occlusion image 1 includes occlusion region information of the subject (object OB2) further on the front side (the origin O side) than a case of the occlusion image 2. Therefore, it can be said that it is effective to use the occlusion image 1 before the occlusion image 2 at a time of full spherical image reproduction. In other words, it can be said that the occlusion image 1 is a more suitable occlusion image to be acquired (used) than the occlusion image 2 out of the two occlusion images.

However, it is difficult for the client device to select (specify) which occlusion image of the occlusion image 1 and the occlusion image 2 is more suitable, that is, which has a higher priority. This is because the client device cannot obtain information for selecting a suitable occlusion image, in a current state.

Not only in the use case U1 described above, but also in the use case U2, the use case U3, and the use case U4, in a case where there are a large number of occlusion images, it is similarly difficult to select suitable one or more occlusion images from among these occlusion images.

Therefore, the client device has been unable to obtain a suitable occlusion image when the transmission band is not sufficient.

Therefore, in the present technology, it is made possible to select and acquire some suitable occlusion image from among a plurality of occlusion images, and consequently made possible to use a transmission band more efficiently.

Specifically, in the present technology, as information for selecting an occlusion image, occlusion coordinate information indicating a position of a viewpoint position of the occlusion image, that is, a position of the origin O', in the full spherical coordinate system and depth level information indicating a depth level of the occlusion image are to be used.

Here, the depth level information (hereinafter also described as depth level) is information based on a distance (depth) from the origin O' indicated by the depth information of the occlusion image, to the subject in the occlusion image. In other words, the depth level information is information regarding a distance (depth) in a depth direction of the subject in the occlusion image.

By using the occlusion coordinate information and the depth level information in this manner, a suitable occlusion image to be acquired from the server can be selected in accordance with a viewpoint position of a user, even in a case where there are occlusion images at a plurality of positions in the full spherical coordinate system, for the main image.

Specifically, for example, it is assumed that, in the use case U2 described above, that is, for example, in a case where there is an occlusion image at the position indicated by arrow A22 in FIG. 3, a viewpoint position of the user is at a position in a positive direction on the x-axis of the full spherical coordinate system, and a full spherical image viewed from the viewpoint position of the user is displayed.

At this time, the occlusion image at the position in the positive direction on the x-axis of the full spherical coordinate system includes occlusion region information necessary for generating the full spherical image for display.

Whereas, an occlusion image at a position in a negative direction on the x-axis of the full spherical coordinate system does not include occlusion region information necessary for displaying the full spherical image according to the viewpoint position of the user.

Furthermore, the occlusion image at a position on the y-axis or the z-axis of the full spherical coordinate system may include occlusion region information necessary for displaying the full spherical image, but an amount of the information should be small as compared to the occlusion image in the positive direction on the x-axis.

This fact shows that the occlusion image to be selected from among the plurality of occlusion images differs depending on the viewpoint position of the user.

In order to select a suitable occlusion image necessary for generating the full spherical image, it is necessary to know which position the occlusion image is at, as viewed from the position of the main image, that is, the position of the origin O.

As information that can specify which position the position (origin O') of each occlusion image is at as viewed from the origin O, which is the position of the main image, it is only required to use the occlusion coordinate information described above.

The occlusion coordinate information is information regarding a viewpoint position of the occlusion image. For example, the occlusion coordinate information is to be coordinates of a position of the origin O' of each occlusion image when coordinates of a position of the origin O of the main image in the full spherical coordinate system are (0, 0, 0), and a unit of coordinates in each axial direction is meter or the like.

Thus, for example, coordinates of a position at a distance of X meters in the positive direction of the x-axis from the origin O in the full spherical coordinate system, at a distance of Y meters in the positive direction of the y-axis from the origin O, and at a distance of Z meters in the positive direction of the z-axis from the origin O are (X, Y, Z).

With such occlusion coordinate information, it is possible to select a suitable occlusion image from a viewpoint position of the user and the occlusion coordinate information.

In other words, on the basis of the occlusion coordinate information, from among a plurality of occlusion images, it is only required to select, as an occlusion image to be acquired, sequentially from one in which viewpoint position of the occlusion image indicated by the occlusion coordinate information is closer to the viewpoint position of the user.

In other words, it is only required to select, as the occlusion image to be acquired, in ascending order of a distance between the viewpoint position of the occlusion image and the viewpoint position of the user.

Note that, in a case where there is a plurality of occlusion images at a same position, it is only required to select (utilize) sequentially from one in which a position of the occlusion region included in the occlusion image in the full spherical coordinate system is closer to a position of the subject in the main image. This is because, as described above, as the position of the occlusion region is closer to the position of the subject of the main image, a utility value is higher.

In order to select the occlusion image whose position of the occlusion region is closer to the position of the subject in the main image from among a plurality of occlusion images having the origin O' at a same position, it is only required to use depth level information.

The depth level information (depth level) is information that is generated on the basis of the depth information regarding the occlusion image and is associated with a depth (depth amount) of the occlusion region in the occlusion image.

Here, it is assumed that the depth amount (depth) of the occlusion region is deeper as the occlusion region in the occlusion image is at a position farther from the origin O'.

In this case, for example, among a plurality of occlusion images at a same position and the like, the depth level information of the occlusion image is to be information indicating an order of a depth amount such as an order of being shallower of the depth amount of the occlusion region of the occlusion image.

Specifically, for example, among a plurality of occlusion images at a same position, depth level of the occlusion image whose occlusion region has a shallowest depth amount (not deep) is set to 1, and a depth level is set to 2, 3, . . . in an order from one having a smaller depth amount of the occlusion region.

In determining the order of the depth amount indicated by the depth level information (depth level), a sum of depth values at individual positions in a predetermined frame of the texture information of the occlusion image, that is, a sum of distances from the origin O' in the full spherical coordinate system to the subject at that position is determined.

Then, among the plurality of occlusion images at a same position, depth level is made smaller as the occlusion image has a smaller total value of the depth values. That is, for example, depth level information (depth level) of an occlusion image with a smallest total value of depth values is set to 1.

Note that, here, an example has been described in which depth level is determined on the basis of a total value of depth values at individual positions. However, without limiting to this, the determination may be made on the basis of information indicating a depth amount (depth) of the occlusion region of each occlusion image, such as an average value of depth values at individual positions.

For example, in a case where a depth level is determined on the basis of an average value of the depth values at individual positions of the occlusion image, it is only required to set a value of depth level to be smaller, that is, set the order of the depth amount to be smaller, for an occlusion image with a smaller average value. Note that, hereinafter, information indicating the average value of the depth values at individual positions of the occlusion image is also referred to as depth average value information.

If such depth level information (depth level) is used, a suitable occlusion image can be selected on the client device side even in a case where there is a plurality of occlusion images at a same position. In other words, in a case where there is a plurality of occlusion images at a same position, it is only required to select the occlusion images sequentially from one with a smaller value of the depth level information.

If there are occlusion coordinate information and depth level information as described above, a suitable occlusion image can be selected in each of the use cases U1 to U4.

Here, a description is given to an example of a method for signaling occlusion coordinate information and depth level information to the client device in the MPEG-DASH.

Specifically, for example, in the MPD file, new EssentialProperty is defined that enables setting of occlusion coordinate information and depth level information for an occlusion image.

In other words, in the example shown in FIG. 4, in EssentialProperty for the texture information of the occlusion image, the portion of schemeIdUri has been set as "urn:mpeg:dash:occlusion:2015".

Instead of this, in the present technology, a portion of schemeIdUri is set as "urn:mpeg:dash:occlusion:2017", and value of schemeIdUri describes a value (x, y, z) of the occlusion coordinate information and a value of the depth level information depth level. Specifically, the values of value are separated by commas to be "x, y, z, depth level".

Therefore, for example, when the occlusion coordinate information is (0, 0, 0) and the value of the depth level information depth level is 1, a portion of EssentialProperty is set as <EssentialProperty schemeIdUri="urn:mpeg:dash:occlusion:2017" value="0,0,0,1">.

As described above, in a case where the MPD file is made to include the occlusion coordinate information and the depth level information of each occlusion image, for example, the MPD file that is applied with the present technology and corresponds to the MPD file shown in FIG. 4 is to be as shown in FIG. 5. Note that, in FIG. 5, a description of a portion corresponding to a case in FIG. 4 is to be omitted suitably since it becomes repetition.

The MPD file shown in FIG. 5 differs from the MPD file shown in FIG. 4 only in portions indicated by arrows Q21 and Q22.

In other words, as indicated by arrow Q21, in AdaptationSet of texture information of the occlusion image 1 in FIG. 5, schemeIdUri is set to "urn:mpeg:dash:occlusion:2017", and a value of value thereof is set to "0, 0, 0, 1".

This fact shows that occlusion coordinate information of the occlusion image 1 is (0, 0, 0), and a value of the depth level information depth level is 1.

Similarly, as indicated by arrow Q22, in AdaptationSet of the texture information of the occlusion image 2, schemeIdUri is set to "urn:mpeg:dash:occlusion:2017", and a value of value thereof is set to "0, 0, 0, 2". This description shows that occlusion coordinate information of the occlusion image 2 is (0, 0, 0), and a value of the depth level information depth level is 2.

Thus, in this example, it can be seen that there are two occlusion images 1 and 2 for the main image, the positions of the origin O' of those occlusion images are both the origin O, which is the position of the main image.

Furthermore, in a case where there is only an allowance for acquiring one of these occlusion image 1 and occlusion image 2 as a result of the measurement of the transmission band, it is only required to select the occlusion image 1 having a smaller value of the depth level information since the positions of these occlusion images are the same.

As described above, according to the present technology, it is possible to select a suitable occlusion image by signaling occlusion coordinate information and depth level information of each occlusion image with the MPD file. As a result, the transmission band can be used more efficiently.

<Configuration Example of File Generation Apparatus>

Subsequently, a more specific embodiment to which the present technology is applied will be described.

FIG. 6 is a diagram showing a configuration example of an embodiment of a file generation apparatus to which the present technology is applied.

A file generation apparatus 11 shown in FIG. 6 includes a control unit 21 and a file generation unit 22. This file generation apparatus 11 generates a segment file and an MPD file of a moving image of a content to be distributed by the MPEG-DASH or the like, and uploads to a server. Note that the moving image of the content mentioned here is a full spherical image for display generated from the above-described main image and an occlusion image related to the main image.

The control unit 21 controls an overall operation of the file generation apparatus 11. For example, the control unit 21 controls the file generation unit 22 to generate a segment file storing a full spherical image or the like, which is a moving image of content, or an MPD file including metadata of the content, and to upload those segment file and MPD file.

The file generation unit 22 generates a segment file and an MPD file in accordance with the control of the control unit 21, and uploads (sends) those segment file and MPD file to the server via a network.

The file generation unit 22 includes a data input unit 31, a data encoding/generation unit 32, an MPD file generation unit 33, a recording unit 34, and an upload unit 35.

The data input unit 31 acquires a main image and image data necessary for generating an occlusion image related to the main image, and metadata necessary for generating an MPD file, such as occlusion coordinate information and depth level information, and supplies to the data encoding/generation unit 32 and the MPD file generation unit 33.

The data encoding/generation unit 32 generates a segment file storing the main image and the occlusion image on the basis of the image data supplied from the data input unit 31, and supplies to the recording unit 34.

The data encoding/generation unit 32 includes a pre-processing unit 41, an encoding unit 42, and a segment file generation unit 43.

On the basis of the image data supplied from the data input unit 31, the pre-processing unit 41 generates a main image and an occlusion image by performing stitch processing for connecting images, and supplies to the encoding unit 42. The encoding unit 42 encodes the main image and the occlusion image supplied from the pre-processing unit 41, and supplies the obtained coded data to the segment file generation unit 43.

On the basis of the metadata and the like supplied from the data input unit 31, the segment file generation unit 43 files the coded data supplied from the encoding unit 42 in units of segments, and supplies a segment file obtained as a result to the recording unit 34. With this operation, a segment file storing the coded data of the texture information of the main image, a segment file storing the coded data of the depth information of the main image, and a segment file storing the coded data of the occlusion image are obtained.

The MPD file generation unit 33 generates an MPD file including information regarding the main image and the occlusion image, on the basis of the metadata supplied from the data input unit 31, and supplies to the recording unit 34. Note that the MPD file generation unit 33 may be adapted to acquire metadata necessary for generating the MPD file from the segment file generation unit 43.

The recording unit 34 records the MPD file supplied from the MPD file generation unit 33 and the segment file supplied from the segment file generation unit 43.

The upload unit 35 reads the MPD file and segment file of the content from the recording unit 34, and uploads to the server. In other words, the upload unit 35 functions as a communication unit that sends the MPD file and the segment file to the server.

Note that, here, an example will be described in which the file generation apparatus 11 functions as an apparatus to upload the MPD file and the segment file to the server, but the file generation apparatus 11 may function as the server. In such a case, the upload unit 35 of the file generation apparatus 11 sends the MPD file and the segment file to the client device via the network.

<Description of Upload Process>

Next, an operation of the file generation apparatus 11 will be described. In other words, an upload process by the file generation apparatus 11 will be described below with reference to the flowchart of FIG. 7.

In step S11, the data input unit 31 acquires image data necessary for generating a main image and an occlusion image, and metadata such as occlusion coordinate information and depth level information, to supply to the pre-processing unit 41, the segment file generation unit 43, and the MPD file generation unit 33.

In step S12, the data encoding/generation unit 32 generates a segment file.

In other words, on the basis of the image data supplied from the data input unit 31, the pre-processing unit 41 generates a main image and an occlusion image by performing stitch processing, and supplies to the encoding unit 42. The encoding unit 42 encodes the main image and the occlusion image supplied from the pre-processing unit 41, and supplies the obtained coded data to the segment file generation unit 43.

On the basis of the metadata and the like supplied from the data input unit 31, the segment file generation unit 43 files the coded data supplied from the encoding unit 42, and supplies a segment file obtained as a result to the recording unit 34.

In step S13, the MPD file generation unit 33 generates an MPD file on the basis of the metadata supplied from the data input unit 31, and supplies to the recording unit 34.

Here, the MPD file includes occlusion coordinate information and depth level information for each occlusion image. Specifically, for example, the MPD file shown in FIG. 5 is generated.

In step S14, the recording unit 34 records the MPD file supplied from the MPD file generation unit 33 and the segment file supplied from the segment file generation unit 43.

In step S15, the upload unit 35 reads the MPD file and the segment file from the recording unit 34 at any timing and uploads to the server, and the upload process is terminated.

Note that the upload timing of the MPD file and segment file may be any timing after these MPD file and segment file are recorded in the recording unit 34.

As described above, the file generation apparatus 11 generates and uploads the MPD file and the segment file.

In particular, the file generation apparatus 11 generates an MPD file including occlusion coordinate information and depth level information for each occlusion image. By doing like this, the client device can select and acquire a suitable occlusion image by using occlusion coordinate information and the depth level information included in the MPD file.

<Configuration Example of Client Device>

Subsequently, a description is given to a client device that acquires the MPD file and the segment file uploaded by the file generation apparatus 11 from the server, and reproduces the content. The client device to which the present technology is applied is configured, for example, as shown in FIG. 8.

Figure 8:
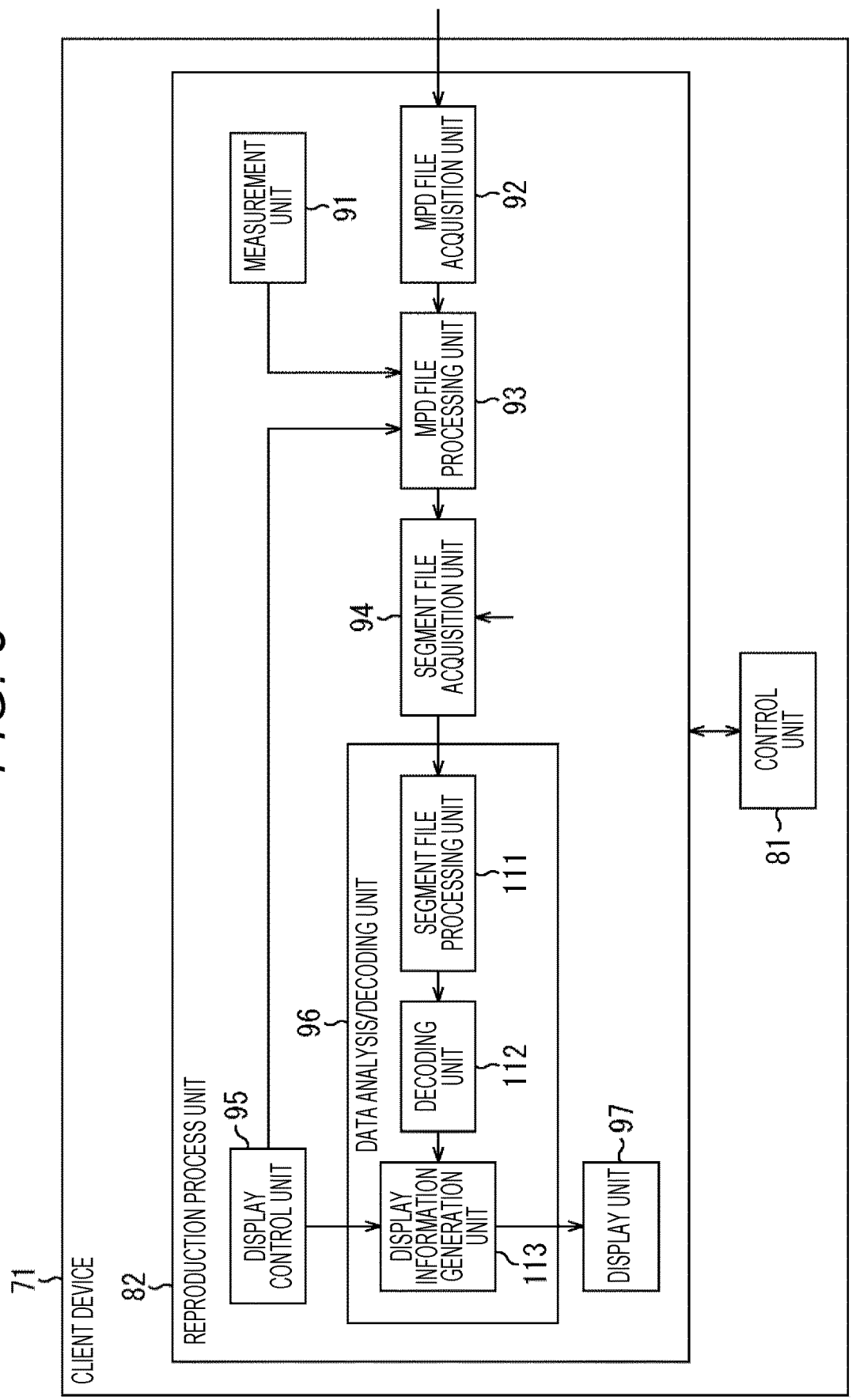
FIG. 8 is a diagram showing a configuration example of a client device.

A client device 71 in FIG. 8 includes a control unit 81 and a reproduction process unit 82.

The control unit 81 controls an overall operation of the client device 71. For example, the control unit 81 controls the reproduction process unit 82 to acquire an MPD file and a segment file from the server, and reproduces a full spherical image, which is a moving image of a content, on the basis of the segment file.

The reproduction process unit 82 reproduces a full spherical image in accordance with the control of the control unit 81. The reproduction process unit 82 includes a measurement unit 91, an MPD file acquisition unit 92, an MPD file processing unit 93, a segment file acquisition unit 94, a display control unit 95, a data analysis/decoding unit 96, and a display unit 97.

The measurement unit 91 measures a transmission band of a network between the client device 71 and the server, and supplies a measurement result thereof to the MPD file processing unit 93. The MPD file acquisition unit 92 acquires the MPD file from the server and supplies to the MPD file processing unit 93.

On the basis of the measurement result supplied from the measurement unit 91, the MPD file supplied from the MPD file acquisition unit 92, and a viewpoint position of the user supplied from the display control unit 95, the MPD file processing unit 93 selects texture information of the main image, depth information of the main image, and information to be acquired among one or more occlusion images, and supplies a selection result thereof to the segment file acquisition unit 94.

More specifically, for the occlusion image, on the basis of a selection order list obtained from the MPD file and a viewpoint position of the user, and on the basis of the measurement result of the transmission band, the MPD file processing unit 93 selects the occlusion images of a number according to the transmission band, as an occlusion image to be acquired. Note that the selection order list will be described later.

On the basis of the selection result supplied from the MPD file processing unit 93, the segment file acquisition unit 94 acquires, from the server, a segment file storing information regarding the main image, occlusion image, and the like necessary for reproducing the content, and supplies to the data analysis/decoding unit 96.

The display control unit 95 controls reproduction (display) of the full spherical image, which is a moving image of the content. For example, the display control unit 95 acquires detection results of a viewpoint position and a gaze direction of a user who views the full spherical image, and supplies to the MPD file processing unit 93 and the data analysis/decoding unit 96.

On the basis of the segment file supplied from the segment file acquisition unit 94, the data analysis/decoding unit 96 generates a moving image of the content, that is, a full spherical image for reproduction (for display), and supplies to the display unit 97.

The data analysis/decoding unit 96 includes a segment file processing unit 111, a decoding unit 112, and a display information generation unit 113.

The segment file processing unit 111 extracts coded data of the main image and the occlusion image from the segment file supplied from the segment file acquisition unit 94, and supplies to the decoding unit 112. The decoding unit 112 decodes the coded data supplied from the segment file processing unit 111, and supplies the main image and the occlusion image obtained as a result, to the display information generation unit 113.

On the basis of detection results of a viewpoint position and a gaze direction of the user supplied from the display control unit 95, and on the basis of the main image and the occlusion image supplied from the decoding unit 112, the display information generation unit 113 generates a full spherical image for display according to the viewpoint position and the gaze direction of the user, more specifically, image data of the full spherical image, and supplies to the display unit 97.

The display unit 97 includes, for example, a liquid crystal display panel and the like, and displays (reproduces) the full spherical image supplied from the display information generation unit 113.

<Description of Selection Order List Generation Process>

Next, an operation of the client device 71 will be described.

First, a selection order list generation process performed by the client device 71 will be described with reference to the flowchart in FIG. 9.

In step S41, the MPD file acquisition unit 92 acquires an MPD file from the server and supplies to the MPD file processing unit 93. In other words, the MPD file sent by the server is received by the MPD file acquisition unit 92.

In step S42, the MPD file processing unit 93 initializes a selection order list.

In the client device 71, in a case where there is a plurality of occlusion images for a main image, a selection order list is generated that indicates a priority of each occlusion image, that is, an order for selecting as one to be acquired (hereinafter also referred to as selection order), and an occlusion image to be acquired is selected in accordance with the selection order list.

In the selection order list, information indicating each occlusion image is arranged from top to bottom in descending order of the priority. Thus, for example, the first occlusion image, that is the top occlusion image in the selection order list, has the highest priority and is the occlusion image to be selected first as one to be acquired.

In step S42, initialization of the selection order list is performed by deleting such information indicating the occlusion image included in the selection order list.

In step S43, the MPD file processing unit 93 acquires a viewpoint position of the user from the display control unit 95.

For example, the display control unit 95 acquires detection results of a viewpoint position and a gaze direction of the user from a sensor or the like (not shown), and supplies to the MPD file processing unit 93 and the display information generation unit 113. The MPD file processing unit 93 obtains the viewpoint position of the user by acquiring the information outputted from the display control unit 95 in this manner. For example, the viewpoint position of the user may be coordinate information and the like of the viewpoint position of the user in the full spherical coordinate system.

In step S44, the MPD file processing unit 93 determines, on the basis of the MPD file supplied from the MPD file acquisition unit 92, whether or not there is an occlusion image that has not been processed yet.

For example, in the MPD file, if there is schemeIdUri of EssentialProperty in AdaptationSet being set to "urn:mpeg:dash:occlusion:2017", this AdaptationSet can be specified as relating to the texture information of the occlusion image.

In a case where there is AdaptationSet of the texture information of the occlusion image not to be processed yet in the MPD file, the MPD file processing unit 93 determines that there is an occlusion image that has not been processed in step S44.

In a case where it is determined in step S44 that there is an unprocessed occlusion image, the MPD file processing unit 93 sets the unprocessed occlusion image as a new occlusion image to be processed, and the process proceeds to step S45.

In step S45, the MPD file processing unit 93 calculates a distance between a position (origin O') of the occlusion image to be processed and the viewpoint position of the user acquired in step S43.

Here, a position of the occlusion image, that is, occlusion coordinate information, can be obtained from a value of value of schemeIdUri of EssentialProperty in AdaptationSet of the texture information of the occlusion image in the MPD file.

On the basis of the occlusion coordinate information thus obtained and the viewpoint position of the user, the MPD file processing unit 93 calculates a distance from the viewpoint position of the user on the full spherical coordinate system to the position of the occlusion image.

In step S46, the MPD file processing unit 93 updates the selection order list on the basis of the distance obtained in the process of step S45 and the depth level information of the occlusion image.

In other words, in the selection order list, the MPD file processing unit 93 adds information indicating an occlusion image determined to be newly processed to the selection order list, such that information indicating each occlusion image is arranged in an order from a smaller (shorter) distance calculated in step S45. With this operation, as occlusion image has a smaller distance calculated in step S45, the selection order becomes smaller (the priority becomes higher).

At this time, in a case where there is a plurality of occlusion images having a same distance calculated in step S45, the selection order list is updated such that these occlusion images are arranged in ascending order of values of the depth level information depth level, in the selection order list. That is, for the occlusion image having a smaller value of the depth level information depth level, the selection order is made smaller (the priority is made higher).

Note that the depth level information of the occlusion image can be obtained from a value of value of schemeIdUri of EssentialProperty in AdaptationSet of the texture information of the occlusion image, similarly to the occlusion coordinate information.

When the selection order list is updated in this way, thereafter, the process returns to step S44, and the above-described process is repeated.

In the above steps S44 to S46, the selection order list is generated on the basis of the occlusion coordinate information, which is information regarding a viewpoint position of the occlusion image, and on the basis of the depth level information, which is information regarding a depth of the occlusion image. In other words, the occlusion image to be acquired is selected.

Furthermore, in a case where it is determined in step S44 that there is no unprocessed occlusion image, that is, all the occlusion images have been processed, the selection order list generation process is terminated since the selection order list including information of all the occlusion images indicated by the MPD file has been obtained (generated).

As described above, the client device 71 generates a selection order list for sequentially selecting an occlusion image having higher priority, that is, being more suitable, from the MPD file and the viewpoint position of the user. By generating the selection order list in this manner, the client device 71 is to be able to select and acquire a suitable occlusion image even in a case where the transmission band is not sufficient.

<Description of File Acquisition Process>

Furthermore, when the selection order list is generated, the client device 71 selects an occlusion image on the basis of the obtained selection order list, and performs a file acquisition process for acquiring the selected occlusion image or the main image. Hereinafter, the file acquisition process by the client device 71 will be described with reference to the flowchart of FIG. 10.

In step S71, the measurement unit 91 measures a transmission band between the client device 71 and the server, and supplies a measurement result thereof to the MPD file processing unit 93.

Figure 9:
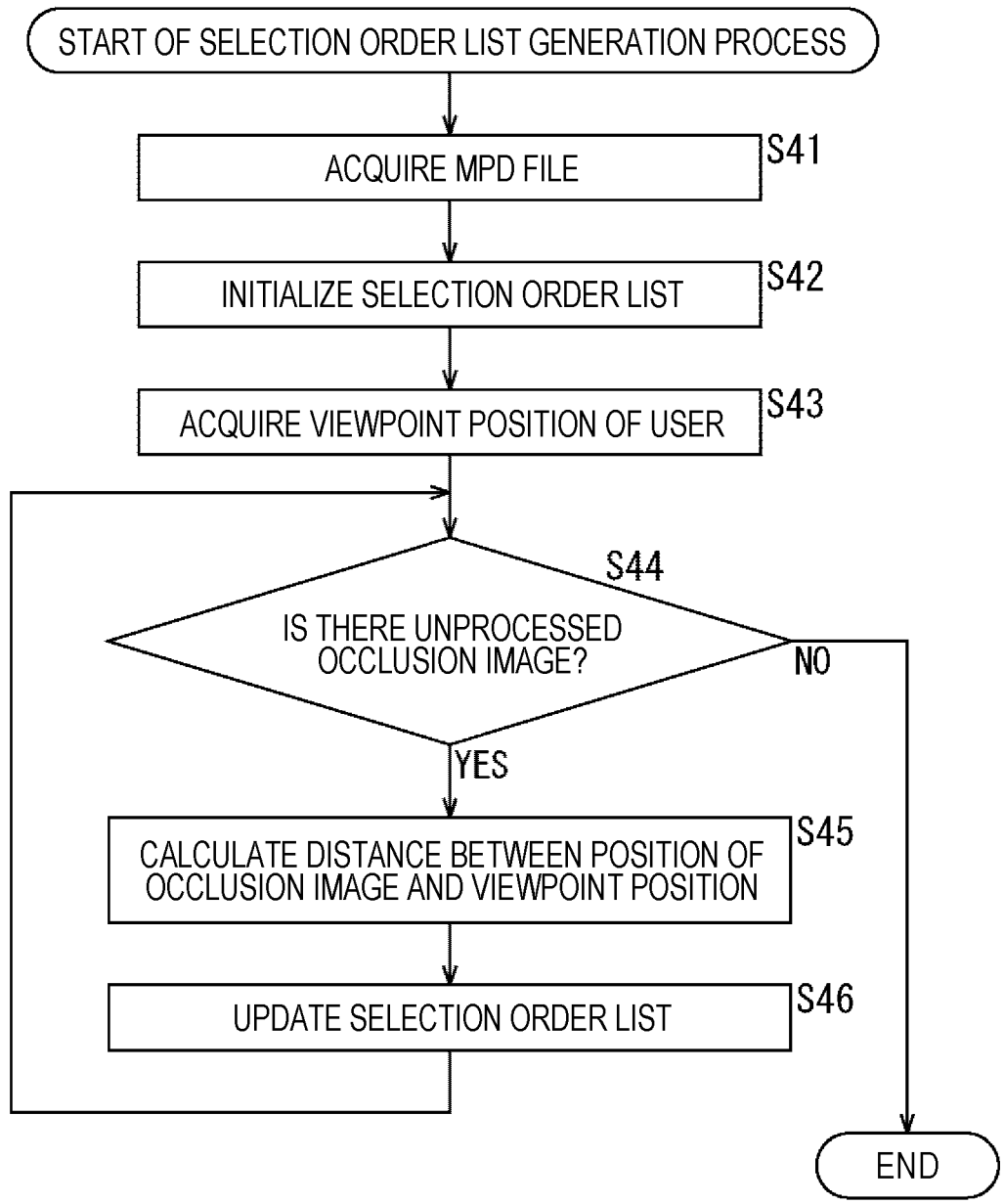
FIG. 9 is a flowchart for explaining a selection order list generation process.

In step S72, the MPD file processing unit 93 selects, as information to be acquired, the texture information of the main image indicated by the MPD file acquired in the process of step S41 in FIG. 9.

In step S73, on the basis of the measurement result of the transmission band obtained in step S71 and supplied from the measurement unit 91, the MPD file processing unit 93 determines whether or not there is a band for acquiring depth information of the main image.

In a case where it is determined in step S73 that there is not a band for acquiring the depth information of the main image, that is, the transmission band is not sufficient, thereafter, the process proceeds to step S74.

In this case, the MPD file processing unit 93 supplies, as a selection result of the information to be acquired, a selection result indicating only the texture information of the main image to the segment file acquisition unit 94, and instructs acquisition of the segment file.

Then, in step S74, the segment file acquisition unit 94 acquires only the texture information of the main image from the server, on the basis of the selection result supplied from the MPD file processing unit 93.

In other words, in accordance with the selection result supplied from the MPD file processing unit 93, the segment file acquisition unit 94 requests the server to send a segment file storing the texture information of the main image. Then, the segment file acquisition unit 94 receives the segment file sent from the server in response to the request and supplies to the segment file processing unit 111, and the file acquisition process is terminated.

On the other hand, in a case where it is determined in step S73 that there is a band for acquiring the depth information of the main image, thereafter, the process proceeds to step S75.

In step S75, the MPD file processing unit 93 selects, as information to be acquired, the depth information of the main image indicated by the MPD file acquired in the process of step S41 in FIG. 9.

In step S76, the MPD file processing unit 93 sets a counter i=1, where the counter i indicates an occlusion image to be processed. In other words, a value of the counter i is set to 1.

Here, the occlusion image indicated by the counter i is an i-th occlusion image, that is, the occlusion image of i-th from the top in the selection order list described with reference to FIG. 9. In other words, the occlusion image indicated by the counter i is an occlusion image whose selection order (priority order) is i-th in the selection order list.

In step S77, the MPD file processing unit 93 determines whether or not to acquire the i-th occlusion image on the basis of the measurement result of the transmission band obtained in step S71.

For example, from the measurement result of the transmission band, in a case where there is still an allowance in the bandwidth for acquiring the i-th occlusion image even after acquiring the texture information and depth information of the main image, it is determined that the i-th occlusion image is to be acquired.

Furthermore, for example, in a case where the i-th occlusion image is not in the selection order list, that is, in a case where the process has been already performed on all the occlusion images included in the selection order list, it is determined that the i-th occlusion image is not to be acquired.

In a case where it is determined in step S77 that the i-th occlusion image is to be acquired, the MPD file processing unit 93 selects the i-th occlusion image as information to be acquired, in step S78.

In step S79, the MPD file processing unit 93 increments the value of the counter i by 1.

When the process of step S79 is performed, thereafter, the process returns to step S77, and the above-described process is repeated.

By the processes of steps S77 to S79, the occlusion images of a number according to the transmission band is to be selected as the occlusion image to be acquired. That is, the occlusion image of the number that can be acquired and is determined by the transmission band is to be selected sequentially from one having a high priority.

Furthermore, in a case where it is determined in step S77 that the i-th occlusion image is not to be acquired, since all the occlusion images have been selected or there is no more allowance to acquire the occlusion image in the transmission band, thereafter, the process proceeds to step S80.

In this case, as a selection result of the information to be acquired, the MPD file processing unit 93 supplies a selection result indicating the texture information and the depth information of the main image and indicating the occlusion image selected in step S78 to the segment file acquisition unit 94, and instructs acquisition of segment file. Note that, in a case where it is determined in step S77 that the first occlusion image is not to be acquired, that is, no occlusion image is to be acquired, a selection result indicating the texture information and the depth information of the main image is supplied to the segment file acquisition unit 94.

In step S80, the segment file acquisition unit 94 acquires the main image and the selected occlusion image from the server, on the basis of the selection result supplied from the MPD file processing unit 93.

In other words, in accordance with the selection result supplied from the MPD file processing unit 93, the segment file acquisition unit 94 requests the server to send a segment file storing the texture information of the main image and a segment file storing the depth information of the main image. Furthermore, in a case where an occlusion image is selected in step S78, the segment file acquisition unit 94 also requests the server to send a segment file storing the selected occlusion image.

Then, the segment file acquisition unit 94 receives the segment file sent from the server in response to the request and supplies to the segment file processing unit 111, and the file acquisition process is terminated.

As described above, the client device 71 selects a suitable occlusion image on the basis of the measurement result of the transmission band and the selection order list, and acquires the selected occlusion image from the server. This operation makes it possible to acquire a suitable occlusion image necessary for reproducing the full spherical image even when the transmission band is not sufficient for acquiring all the occlusion images, and to efficiently utilize the transmission band.

Note that an example of selecting an occlusion image to be acquired by using the selection order list has been described above, but it is possible to select a suitable occlusion image to be acquired without particularly generating a selection order list.

In such a case, the MPD file processing unit 93 is only required to sequentially the select occlusion images to be acquired of a number according to the transmission band, on the basis of a measurement result of the transmission band, a viewpoint position of the user, occlusion coordinate information, and depth level information.

At that time, with regard to which occlusion image is to be selected, similarly to a case of using the selection order list, it is only required to select sequentially from an occlusion image in which a viewpoint position (origin O') is closer to a viewpoint position of the user. Furthermore, in a case where there is a plurality of occlusion images at a same position, it is only required to select the occlusion images in ascending order of a value of the depth level information.

The technique of generating the selection order list described above is particularly useful for determining an order for selecting occlusion images in a case where the user slightly moves a viewpoint position, that is, in a case of performing looking-in display.

Furthermore, this technique is also useful for prefetching, which is to acquire an occlusion image near the origin O when there is an allowance in the transmission band, in a case where looking-in display is not performed, that is, the viewpoint position of the user is at the origin O.

In this case, although the selection order list generation process described with reference to FIG. 9 is performed, (0, 0, 0) is to be acquired as the viewpoint position of the user in step S43. By performing such prefetching, thereafter, when looking-in is performed by the user, that is, when movement of the viewpoint position occurs, it is possible to immediately perform looking-in display by using the acquired occlusion image.

<Description of Reproduction Process>

When a segment file is acquired from the server as described above, the client device 71 performs a reproduction process for reproducing a full spherical image on the basis of the acquired segment file. The reproduction process performed by the client device 71 will be described below with reference to the flowchart of FIG. 11.

In step S111, the segment file processing unit 111 extracts coded data of the main image and the occlusion image from the segment file supplied from the segment file acquisition unit 94, and supplies to the decoding unit 112.

In step S112, the decoding unit 112 decodes the coded data supplied from the segment file processing unit 111, and supplies the main image and the occlusion image obtained as a result to the display information generation unit 113.

In step S113, on the basis of detection results of a viewpoint position and a gaze direction of the user supplied from the display control unit 95, and on the basis of the main image and the occlusion image supplied from the decoding unit 112, the display information generation unit 113 generates a full spherical image for display according to the viewpoint position and the gaze direction of the user, and supplies to the display unit 97.

Figure 10:
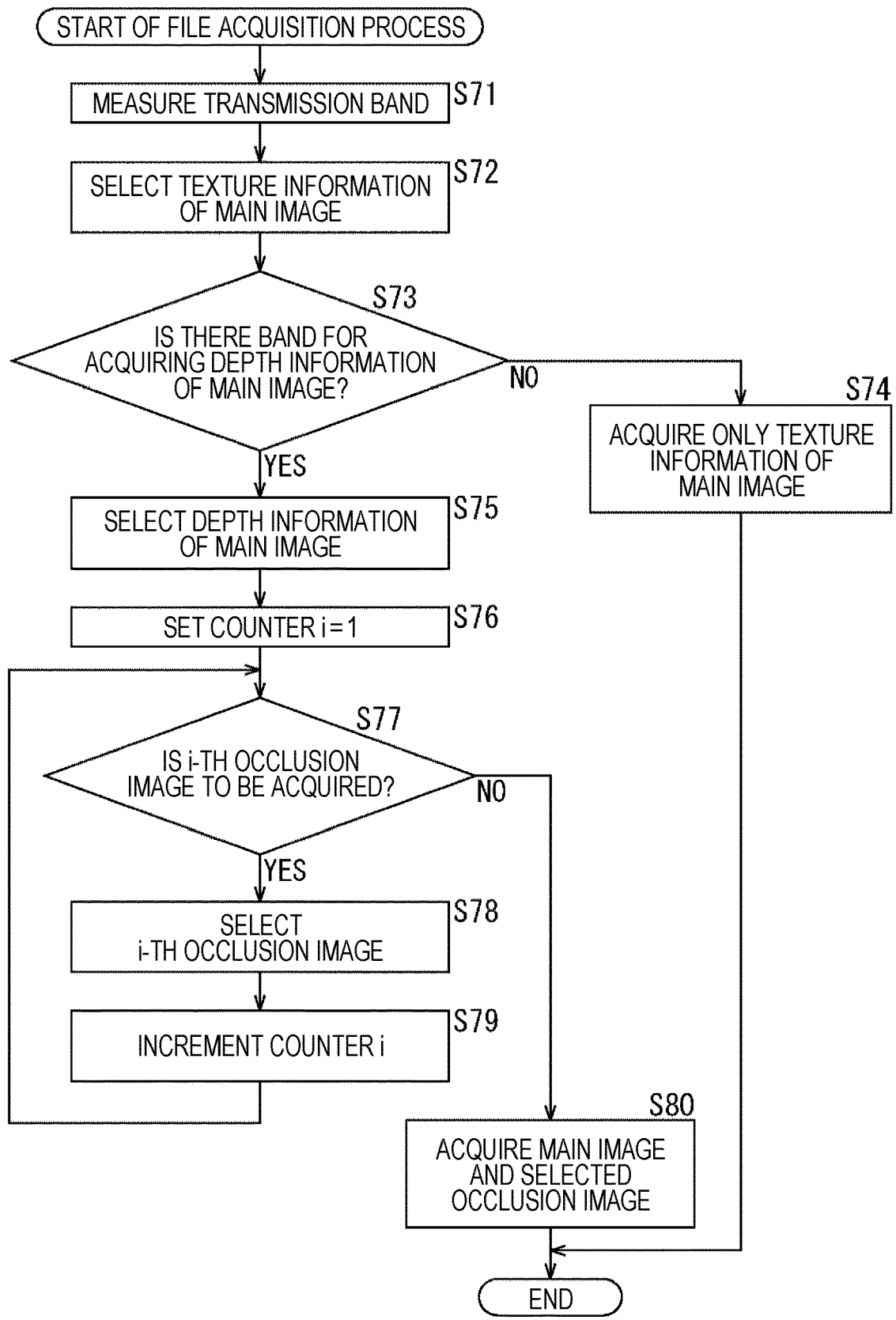
FIG. 10 is a flowchart for explaining a file acquisition process.

For example, in a case where the process of step S74 is performed in the file acquisition process shown in FIG. 10, only the texture information of the main image is obtained in step S111. Therefore, only the texture information of the main image is used to generate a full spherical image for display in step S113.

Furthermore, for example, in a case where only the segment file of the texture information and the depth information of the main image is acquired in step S80 of the file acquisition process shown in FIG. 10, only the texture information and the depth information of the main image are obtained in step S111. Therefore, in step S113, only the texture information and the depth information of the main image are used to generate a full spherical image for display.

Moreover, for example, in a case where each segment file of the texture information of the main image, the depth information of the main image, and the occlusion image is acquired in step S80 of the file acquisition process shown in FIG. 10, the texture information and the depth information of the main image, and the occlusion image are obtained in step S111. Therefore, in step S113, the main image and the occlusion image are used to generate a full spherical image for display.

In step S114, the display unit 97 displays (reproduces) the full spherical image for display supplied from the display information generation unit 113, and the reproduction process is terminated.

As described above, on the basis of the acquired segment file, the client device 71 generates and reproduces a full spherical image for display. This operation makes it possible to display a high quality full spherical image that also displays a region that becomes occlusion for the main image even if the viewpoint position of the user moves, when an occlusion image is obtained.

As described above, the present technology is useful for selectively acquiring some suitable occlusion image when the transmission band is limited in a case where there is a plurality of occlusion images.

In particular, in the technique described in the first embodiment, in all the cases of the use case U1 to the use case U4 described above, occlusion coordinate information and depth level information are signaled from the server to the client device 71 such that a suitable occlusion image can be selected.

In this technique, in any of the use cases, in a case where a viewpoint position of the user is at the origin O, that is, in a case where looking-in is not performed, it is possible to immediately control display to follow a movement of the viewpoint position of the user by selecting an occlusion image at a position close to the origin O of the main image.

Furthermore, in a case where a viewpoint position of the user is a position other than the origin O, that is, looking-in is being performed, it is possible to select an occlusion image including a large amount of occlusion region information necessary for display, by using occlusion coordinate information and depth level information.

Second Embodiment

<About Selection of Occlusion Image>

Meanwhile, in the technique of signaling occlusion coordinate information and depth level information, in the client device 71, a case where it is necessary to simultaneously use the occlusion coordinate information and the depth level information is only a specific case.

Specifically, only in a case where an occlusion image exists at a position of the origin O and a position other than the origin O, and there is a plurality of occlusion images at a same position, a suitable occlusion image cannot be selected unless the occlusion coordinate information and the depth level information are used simultaneously. In other words, it is only a case of the use case U4 shown in FIG. 3.

In a case of the use case U1 described above, since the occlusion image exists only at the position of the origin O, the selection of the occlusion image only requires the depth level information, and does not require the occlusion coordinate information.

Furthermore, in a case of the use case U2, since a plurality of occlusion images does not exist at a same position, the selection of the occlusion image only requires the occlusion coordinate information, and does not require the depth level information.

In a case of the use case U3, there is a plurality of occlusion images at the position of the origin O, and only one occlusion image exists at another position. Therefore, in the use case U3, only the depth level information is required in a case where a viewpoint position of the user is the position of the origin O, and only the occlusion coordinate information is required for a position other than the origin O. Therefore, the depth level information and the occlusion coordinate information are not necessarily used simultaneously.

Thus, in the use case U1 to use case U3, even when the occlusion coordinate information and the depth level information are signaled to the client device 71, only one of these pieces of information is to be required. Therefore, if more efficient signaling can be performed, an amount of data of the MPD file can be reduced.

Furthermore, in the technique of signaling occlusion coordinate information and depth level information, in the client device 71, it is necessary to determine a distance from a viewpoint position of the user to a position of the occlusion image when selecting an occlusion image.

Such a distance to the position of the occlusion image is used by the use case U2, the use case U3, and the use case U4.

When selecting an occlusion image, in order to select an occlusion image at a position close to a viewpoint position of the user, it is necessary to calculate all the distances between a position of each occlusion image and the viewpoint position of the user, every time the viewpoint position of the user changes.

Therefore, in a case where there are a large number of occlusion images and the viewpoint position of the user changes frequently, the distance must be calculated each time, which increases an amount of calculation.

Therefore, in order to more efficiently signal information to be used for selecting an occlusion image, only information necessary for selecting an occlusion image may be transmitted with an MPD file, by switching information to be signaled with a selection information flag, which is flag information.

Furthermore, in order to reduce an amount of calculation of a distance from a viewpoint position of the user, occlusion direction information, or occlusion direction information and occlusion distance information may be used in place of occlusion coordinate information, as information regarding the viewpoint position of the occlusion image.

Here, the occlusion direction information is an index indicating a direction in which a position of the origin O' of the occlusion image exists, with the origin O in the full spherical coordinate system as a reference, that is, viewed from a position of a main image as a reference.

Figure 12:
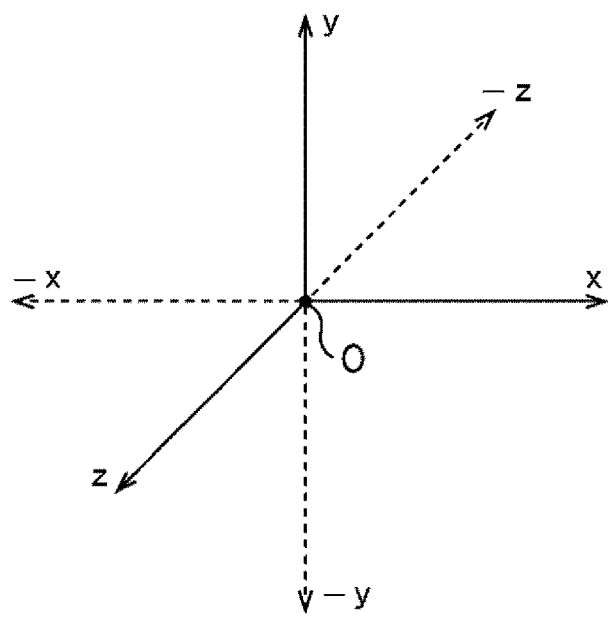
FIG. 12 is a view for explaining occlusion direction information.

As an example, the occlusion direction information is to be, for example, as shown in FIG. 12, considered as information indicating any of a total of the six directions of x direction, y direction, z direction, −x direction, −y direction, and −z direction in the full spherical coordinate system. Note that the coordinate system with the origin O as the reference shown in FIG. 12 is the same full spherical coordinate system as the coordinate system shown in FIG. 3.

In this example, for example, the x direction indicates a positive direction of the x-axis of the full spherical coordinate system. When the occlusion direction information is the x direction, it indicates that the occlusion image is located in the positive direction of the x-axis when viewed from the origin O. Furthermore, for example, the −x direction indicates a negative direction of the x-axis in the full spherical coordinate system.

However, here, the occlusion direction information of each occlusion image is one of the six directions. Therefore, when the occlusion image is not located on an axis of the full spherical coordinate system, the occlusion direction information is to be information indicating a rough direction in which the occlusion image exists, viewed from the origin O.

In this case, the occlusion direction information cannot specify the exact direction in which the occlusion image exists, but it is possible to more easily select the occlusion image by limiting the directions indicated by the occlusion direction information to the six directions.

Furthermore, the occlusion distance information is information indicating a distance from the origin O, which is a position of the main image in the full spherical coordinate system, to a position of the origin O' of the occlusion image.

In the first embodiment described above, in the client device 71, a distance from a viewpoint position of the user to the origin O' of the occlusion image is determined.

On the other hand, in a case where the occlusion image is selected with use of the occlusion direction information and the occlusion distance information, in the client device 71, it is only required to determine a direction of a viewpoint position of the user (hereinafter also referred to as a viewpoint position direction) viewed from the origin O, and a distance from the origin O to the viewpoint position of the user (hereinafter, also referred to as a viewpoint position distance). Note that the viewpoint position direction may also be any of the six directions described above.

When selecting an occlusion image, among a plurality of occlusion images, it is only required to select an occlusion image whose direction indicated by the occlusion direction information is coincident with the viewpoint position direction, more specifically, is in a direction close to the viewpoint position direction.

Furthermore, when there is a plurality of occlusion images whose direction indicated by the occlusion direction information is the same direction as the viewpoint position direction, it is only required to select, among these occlusion images, sequentially one whose distance indicated by the occlusion distance information is close to the viewpoint position distance. Doing like this also allows the occlusion image to be selected sequentially from one whose origin O' is close to the viewpoint position of the user.

In a case of using the occlusion distance information, an amount of calculation can be reduced as compared to a case of determining a distance from a viewpoint position of the user to the origin O' of the occlusion image, since it is only required to perform processing for comparing the occlusion distance information with the viewpoint position distance.

In the present embodiment, the selection information flag, the occlusion direction information, and the occlusion distance information as described above are used. Note that, in the present embodiment, a case is assumed where the arrangement of the occlusion image is the use case U1, the use case U2, or the use case U3.

Specifically, for example, as shown in FIG. 13, by switching depth level information (depth level), depth average value information (depth average value), occlusion direction information, and occlusion direction information and occlusion distance information in accordance with the selection information flag, the efficiency of signaling can be improved, and an amount of calculation in the client device 71 can be reduced.

In the example of FIG. 13, the selection information flag is information indicating which of the depth level information, the depth average value information, the occlusion direction information, and the occlusion direction information and the occlusion distance information is included.

Here, in a case where a value of the selection information flag is "00", information to be signaled that is selected with the selection information flag (hereinafter, also referred to as a selection information value) is to be the depth level information (depth level). In other words, in a case where a value of the selection information flag is "00", only the depth level information is transmitted to the client device 71. Here, the selection information value is to be information for selecting an occlusion image.

Furthermore, in a case where a value of the selection information flag is "01", the selection information value is to be the depth average value information (depth average value). Here, the depth average value information is information indicating a depth of the occlusion image corresponding to the depth level information, and is information indicating an average value of depth values at individual positions of an occlusion image.

In a case where a value of the selection information flag is "10", the selection information value is to be the occlusion direction information. In a case where a value of the selection information flag is "11", the selection information value is to be the occlusion direction information and the occlusion distance information.

Here, a case of actually performing signaling with use of the selection information flag in MPEG-DASH will be described.

In such a case, for example, in AdaptationSet of texture information of an occlusion image in the MPD file shown in FIG. 4, schemeIdUri is set to "urn:mpeg:dash:occlusion:2017", and the selection information flag and the selection information value are described in a value of value thereof.

Specifically, the values of value are separated by a comma to be "selection information flag, selection information value".

Furthermore, when the value of the selection information flag is "11" and the occlusion direction information and the occlusion distance information are taken as the selection information value, values of the occlusion direction information and the occlusion distance information are described while being separated by blanks.

In other words, for example, it is assumed that a value of the occlusion direction information is "x" and a value of the occlusion distance information is "0.5". In this case, a portion of EssentialProperty is to be <EssentialProperty scheme IdUri="urn:mpeg:dash:occlusion:2017" value="11, x 0.5">.

From such a value of value, from the value "11" of the selection information flag, it can be seen that this AdaptationSet includes occlusion direction information and occlusion distance information as the selection information value. Furthermore, it can be seen that a direction indicated by the occlusion direction information is the x direction, and a distance indicated by the occlusion distance information is 0.5 m.

Furthermore, for example, in a case of the use case U1, an MPD file to which the present technology is applied corresponding to the MPD file shown in FIG. 4 is to be as shown in FIG. 14. Note that, in FIG. 14, a description of a portion corresponding to a case in FIG. 4 is to be omitted suitably since it becomes repetition.

The MPD file shown in FIG. 14 differs from the MPD file shown in FIG. 4 only in portions indicated by arrows Q31 and Q32.

In other words, as indicated by arrow Q31, in AdaptationSet of texture information of an occlusion image 1 in FIG. 14, schemeIdUri is set to "urn:mpeg:dash:occlusion:2017", and a value of value thereof is set to "00, 1".

This fact shows that, for the occlusion image 1, a value of the selection information flag is "00", depth level information is included as the selection information value, and a value of the depth level information, that is, depth level, is "1".

Similarly, in AdaptationSet of texture information of an occlusion image 2, as indicated by arrow Q32, schemeIdUri is set to "urn:mpeg:dash:occlusion:2017", and a value of value thereof is "00, 2".

This fact shows that, for the occlusion image 2, a value of the selection information flag is "00", depth level information is included as the selection information value, and a value of the depth level information is "2".

Accordingly, it is understood that the client device 71 is only required to select the occlusion image 1 before the occlusion image 2.

<Description of Selection Order List Generation Process>

As described above, in a case where the MPD file includes the selection information flag and the selection information value, the file generation apparatus 11 and the client device 71 perform the following process.

Figure 7:
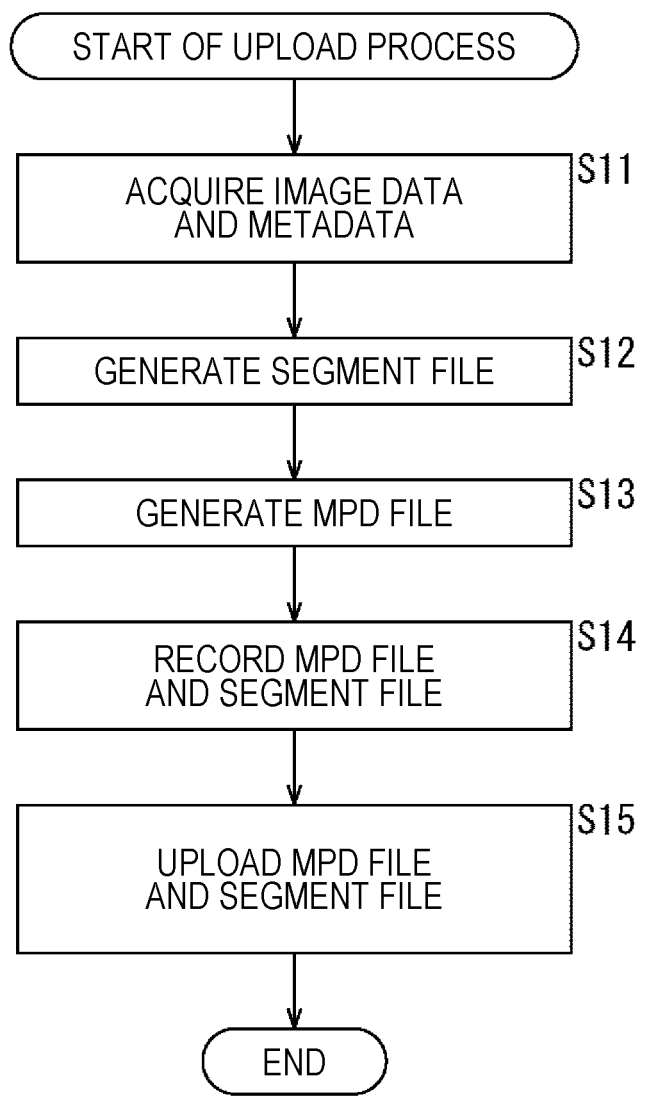
FIG. 7 is a flowchart for explaining an upload process.

In other words, in the file generation apparatus 11, in step S13 in the upload process of FIG. 7, the MPD file generation unit 33 generates an MPD file in which AdaptationSet of texture information of each occlusion image includes a selection information flag and a selection information value of those occlusion images.

Figure 15:
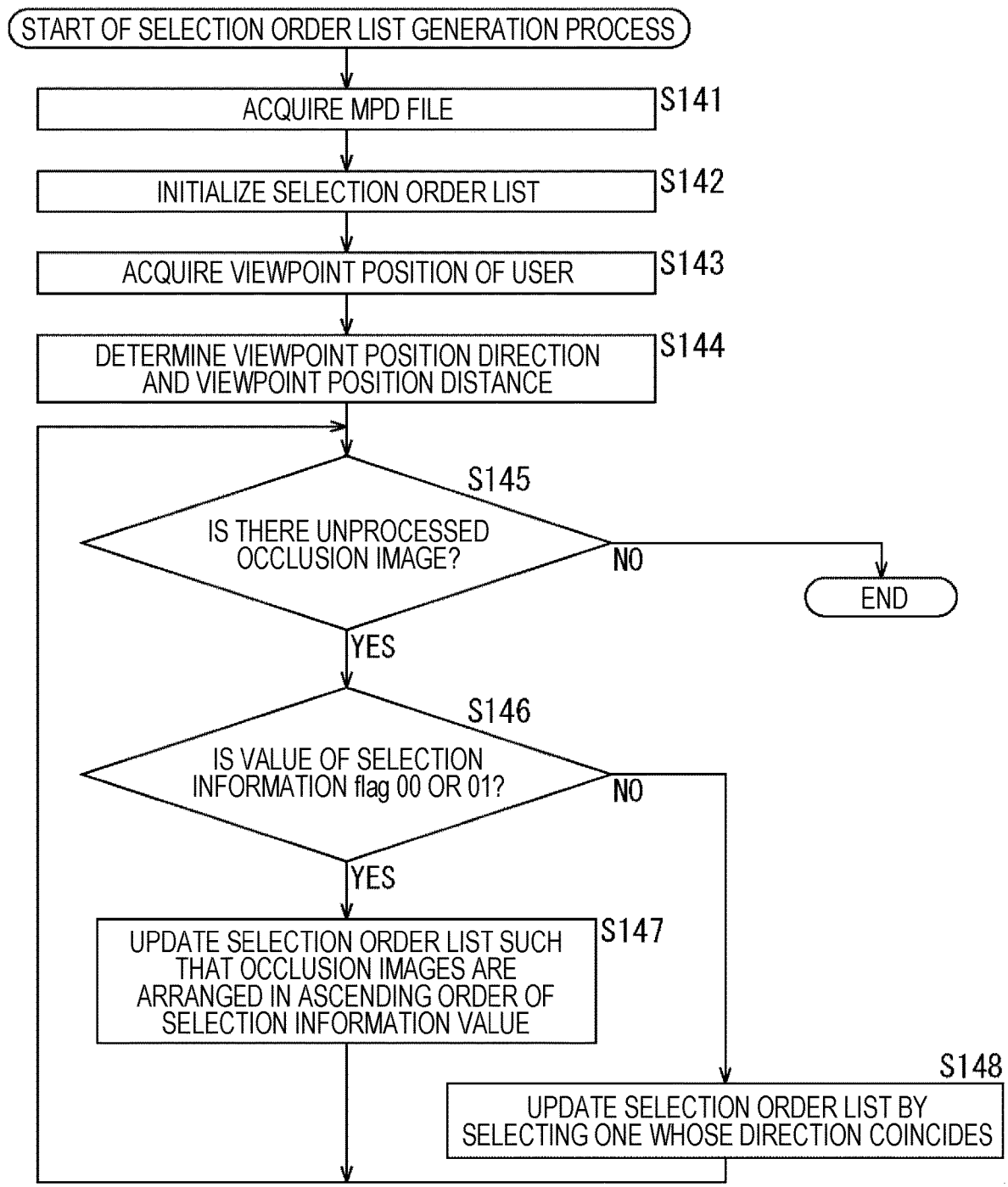
FIG. 15 is a flowchart for explaining the selection order list generation process.

Furthermore, in the client device 71, the selection order list generation process shown in FIG. 15 is performed to generate a selection order list. Hereinafter, a selection order list generation process by the client device 71 will be described with reference to the flowchart in FIG. 15.

Note that, since the process of step S141 to step S143 is similar to the process of step S41 to step S43 of FIG. 9, the description thereof is omitted.

In step S144, the MPD file processing unit 93 determines a viewpoint position direction and a viewpoint position distance of a user, on the basis of a viewpoint position of the user acquired in the process of step S143.

In step S145, on the basis of the MPD file supplied from the MPD file acquisition unit 92, the MPD file processing unit 93 determines whether or not there is an occlusion image that has not been processed yet. In step S145, a process similar to step S44 in FIG. 9 is performed.

In a case where it is determined in step S145 that there is an unprocessed occlusion image, the MPD file processing unit 93 sets the unprocessed occlusion image as a new occlusion image to be processed, and the process proceeds to step S146.

In step S146, the MPD file processing unit 93 determines whether or not a value of a selection information flag of an occlusion image to be processed in the MPD file is "00" or "01".

In a case where it is determined in step S146 that the value of the selection information flag is "00" or "01", that is, in a case where depth level information (depth level) or depth average value information (depth average value) is included as the selection information value, the process proceeds to step S147.

In step S147, on the basis of the depth level information or the depth average value information included as the selection information value in the MPD file, the MPD file processing unit 93 updates the selection order list such that the occlusion images are arranged in ascending order of the selection information value.

In other words, the MPD file processing unit 93 adds information indicating an occlusion image determined to be newly processed to the selection order list such that the information indicating each occlusion image is arranged from top to bottom in ascending order of a value of the depth level information or the depth average value information, in the selection order list.

When the selection order list is updated in this way, thereafter, the process returns to step S145, and the above-described process is repeated.

Furthermore, in a case where it is determined in step S146 that the value of the selection information flag is not "00" or "01", that is, the value of the selection information flag is "10" or "11", the process proceeds to step S148.

In this case, as the selection information value of the occlusion image to be processed in the MPD file, only the occlusion direction information, or the occlusion direction information and the occlusion distance information are included.

In step S148, on the basis of the occlusion direction information included in the MPD file as the selection information value, the MPD file processing unit 93 updates the selection order list by selecting one whose direction indicated by the occlusion direction information coincides with the viewpoint position direction.

In other words, in a case where a direction indicated by the occlusion direction information of the occlusion image to be processed coincides with the viewpoint position direction of the user determined in step S144, the MPD file processing unit 93 updates the selection order list by adding the information indicating the occlusion image to be processed, to the selection order list.

Note that, in a case where the viewpoint position direction is not set to one of the six directions described above, but set to a direction of a viewpoint position of the user viewed from the origin O, it is only required to determine that the direction indicated by the occlusion direction information coincides with the viewpoint position direction in a case where an angle between the direction indicated by the occlusion direction information and the viewpoint position direction is equal to or less than a predetermined threshold value.

Furthermore, in some cases, there may be a plurality of occlusion images whose direction indicated by the occlusion direction information coincides with the viewpoint position direction. In such a case, when the value of the selection information flag is "11" and the MPD file includes occlusion distance information, the selection order list is only required to be updated with use of the occlusion distance information and the viewpoint position distance as well.

In other words, the MPD file processing unit 93 updates the selection order list such that occlusion images whose direction indicated by the occlusion direction information coincides with the viewpoint position direction are arranged in ascending order of a difference between the distance indicated by the occlusion distance information and the viewpoint position distance.

Furthermore, an occlusion image whose direction indicated by the occlusion direction information does not coincide with the viewpoint position direction may not be included in the selection order list, or may be included in the selection order list with the selection order set to a lower order.

When the selection order list is updated in this way, thereafter, the process returns to step S145, and the above-described process is repeated.

For example, in the use case U1 described above, the process of step S147 is only required to be performed to generate the selection order list with a value of a selection information flag of each occlusion image being set to "00" or "01", since there are two occlusion images at the origin O.

Furthermore, in the use case U2, the process of step S148 is only required to be performed to generate the selection order list with a value of a selection information flag of each occlusion image being set to "10" or "11", since a plurality of occlusion images does not exist at a same position.

In the use case U3, there are two occlusion images at the origin O and one occlusion image at another position.

Therefore, in the use case U3, for example, a value of the selection information flag may be set to "00" or "01" for the occlusion images at the origin O, while a value of the selection information flag may be set to "10" or "11" for the occlusion image at a position other than the origin O.

In this case, for the occlusion image at a position other than the origin O, step S148 is only required to be performed to update the selection order list. Furthermore, the occlusion images at the origin O may be added to a lowermost position of the selection order in the selection order list in step S147, for example, while assuming that these occlusion images are used only for prefetching. Conversely, the occlusion images at the origin O may be added to an uppermost position of the selection order in the selection order list.

As described above, in steps S146 to S148, the occlusion image is selected and the selection ordered list is generated on the basis of at least one of information regarding a viewpoint position of the occlusion image such as the occlusion direction information and the occlusion distance information, or information regarding a depth of the occlusion image such as the depth level information and the depth average value information.

Furthermore, in a case where it is determined in step S145 that there is no unprocessed occlusion image, that is, all the occlusion images have been processed, the selection order list generation process is terminated since the selection order list has been obtained (generated).

As described above, the client device 71 generates a selection order list for sequentially selecting suitable occlusion images on the basis of the selection information value. By generating the selection order list in this manner, the client device 71 is to be able to select and acquire a suitable occlusion image even in a case where the transmission band is not sufficient.

In particular, since the selection information flag and the selection information value are included in the MPD file, it is possible to acquire only the information necessary for selecting the occlusion image, and efficiently generate the selection order list. Furthermore, when generating the selection order list on the basis of the occlusion distance information and the viewpoint position distance, it is possible to reduce an amount of calculation at a time of generation of the selection order list as compared with a case of using a distance between the viewpoint position of the user and the origin O'.

Figure 11:
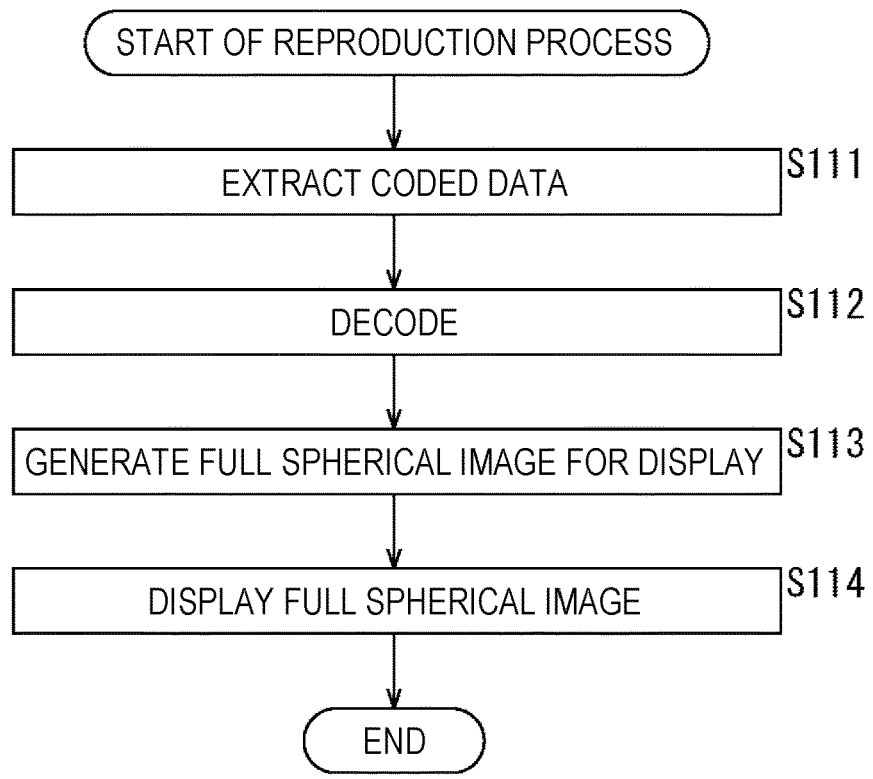
FIG. 11 is a flowchart for explaining a reproduction process.

When the selection order list is generated in this way, thereafter, in the client device 71, the file acquisition process described with reference to FIG. 10 and the reproduction process described with reference to FIG. 11 are performed.

Note that, in the above, an example has been described in which a direction indicated by the occlusion direction information is any one of the six predetermined directions.

However, without limiting to this, a direction indicated by the occlusion direction information may be such as a total of the 26 directions of, for example, −xyz direction, −xy direction, −xy-z direction, −xz direction, −x direction, −x-z direction, −x-yz direction, −x-y Direction, −x-y-z direction, yz direction, y direction, y-z direction, z direction, −z direction, −yz direction, −y direction, −y-z direction, xyz direction, xy direction, xy-z direction, xz direction, x direction, x-z direction, x-yz direction, x-y direction, and x-y-z direction. Here, for example, the −xy-z direction is a direction of a vector obtained by adding a unit vector in the −x direction, a unit vector in the y direction, and a unit vector in the −z direction.

Furthermore, a yaw angle or a pitch angle may be used to indicate each direction of occlusion direction information, such as the six directions or the 26 directions.

Here, the yaw angle is, for example, a rotation angle centered on the y-axis in the full spherical coordinate system shown in FIG. 12, and a counterclockwise direction when the origin O is viewed from the positive direction of the y-axis is a positive direction of the yaw angle. Furthermore, the pitch angle is a rotation angle centered on the x-axis in the full spherical coordinate system shown in FIG. 12, and a counterclockwise direction when the origin O is viewed from the positive direction of the x-axis is a positive direction of the pitch angle.

Therefore, for example, when being shown with use of the yaw angle and the pitch angle, the x direction, the y direction, the z direction, the −x direction, the −y direction, and the −z direction are to be as shown in FIG. 16. In other words, for example, the x direction is a direction in which the yaw angle is 90 degrees and the pitch angle is 0 degrees.

Moreover, as the occlusion distance information, a distance range group indicating a distance range may be used rather than a specific value of the distance itself.

For example, the distance range group is a group of a distance range when distances from the origin O to the origin O' of the occlusion image are divided into a group of a range from 0 m to 0.5 m, a group of the range from 0.5 m to 1.0 m, and the like.

In this case, the occlusion distance information is to be a largest distance value and the like of a distance range group to which a distance from the origin O to the origin O' belongs, among a plurality of distance range groups prepared in advance. Therefore, for example, in a case where the distance from the origin O to the origin O' belongs to a group of a range from 0.5 m to 1.0 m, a value of the occlusion distance information is set to "1.0" or the like.

Besides, the occlusion distance information may be a distance rank indicating an order of being smaller (shorter) distance among distances from the origin O to the origin O' of a plurality of occlusion images. Furthermore, the occlusion distance information may be a distance range group rank indicating an order of being smaller (shorter) range of a distance range group to which the distance from the origin O to the origin O' belongs, among the plurality of distance range groups.

Moreover, in the second embodiment described above, occlusion coordinate information is not used, but the occlusion coordinate information may also be signaled to the client device 71 as the selection information value. In such a case, it is only required to select an occlusion image by using the occlusion coordinate information as the selection information value, in a case where selection of the occlusion image with other information is difficult. That is, it is only required to generate the selection order list by using the occlusion coordinate information.

In the technique described in the second embodiment above, by signaling only the information necessary for selecting an occlusion image, it is possible to reduce an amount of information to be signaled as compared with the technique described in the first embodiment.

Furthermore, an occlusion image can be selected with a smaller amount of calculation by using the occlusion direction information and the occlusion distance information instead of the occlusion coordinate information. This is because it is possible to determine a viewpoint position direction from a viewpoint position of the user, select occlusion images whose direction indicated by the occlusion direction information coincides with the viewpoint position direction, and select an occlusion image close to the viewpoint position distance by further using the occlusion distance information from there. The calculation at a time of selecting these occlusion images can be performed more simply than determining a distance between positions of all the occlusion images and a viewpoint position of the user.

Third Embodiment

<About Selection of Occlusion Image>

Note that, in the first and second embodiments described above, for example, in the use case U2, in a case where a viewpoint position of the user is at the origin O of the full spherical coordinate system, that is, in a case where the user is not looking in, it is possible to display a full spherical image of a viewpoint after movement immediately when the viewpoint position of the user moves, by acquiring the occlusion image in advance.

In this case, for example, when occlusion images are selected in an order from one having a shorter distance between a viewpoint position of the user and a position of the occlusion image, or in an order from one whose distance from the origin O to the origin O' is closer to a viewpoint position distance of the user, a plurality of occlusion images with a same distance may be selected in some cases. Furthermore, in the second embodiment, when there is a plurality of occlusion images at a same distance, it is not possible to determine the selection order of these occlusion images.

From such a fact, for example, when there is a direction in which a viewpoint position with a high degree of attention is present for a full spherical image, which is a content, it is preferable to preferentially acquire an occlusion image in that direction.

Accordingly, for example, a priority flag indicating whether or not the occlusion image should be preferentially selected may be used.

For example, a value "1" of the priority flag indicates that the occlusion image should be selected preferentially, and a value "0" of the priority flag indicates that the occlusion image is not to be selected preferentially.

By using such a priority flag, in the client device 71, when there is a plurality of occlusion images at a same distance from the origin O, an occlusion image can be suitably selected by preferentially acquiring an occlusion image whose value of the priority flag is "1".

Furthermore, a priority order of the occlusion image may be set instead of the priority flag.

Specifically, for example, the priority order can be set for each occlusion image such that the priority order of the highest priority occlusion image is set to 1, and the priority order value is made smaller as the priority is higher.

In this case, in the client device 71, for example, when there is a plurality of these occlusion images at a same distance from the origin O, it is only required to select sequentially from one having a smaller value of the priority order, from the plurality of occlusion images.

Such a priority flag and a priority order are information regarding a priority of the occlusion image.

As a method of signaling the priority flag and the priority order to the client device 71, for example, it is conceivable to use the selection information flag similarly to the second embodiment.

In other words, for example, as shown in FIG. 17, it is only required to determine a selection information value in advance for each value of the selection information flag.

In the example shown in FIG. 17, when a value of the selection information flag is "1000", the selection information value is to be a value of the priority flag, and when a value of the selection information flag is "1001", the selection information value is to be a value of the priority order.

Here, a description is given to a case of actually performing signaling of the priority flag and the priority order with use of the selection information flag in the MPEG-DASH.

In such a case, for example, in AdaptationSet of texture information of an occlusion image in the MPD file shown in FIG. 4, schemeIdUri is set to "urn:mpeg:dash:occlusion:2017", and the selection information flag and the selection information value shown in FIG. 17 are described in a value of value thereof. Specifically, the values of value are separated by a comma to be "selection information flag, selection information value". For example, in a case where a value of the selection information flag is "1001" and a value of the priority order is "2", a portion of EssentialProperty is set to be <EssentialProperty schemeIdUri="urn:mpeg:dash:occlusion:2017" value="1001,2">.

The priority flag and the priority order can be simultaneously used in combination with depth level information and the like described in the second embodiment.

In such a case, for example, after the process of step S147 or step S148 of FIG. 15, a more accurate selection order of the occlusion image can be determined by further using the priority flag and the priority order.

In a case of simultaneously performing signaling of the priority flag and the priority order and signaling of the depth level information and the like, for example, at least two pieces of EssentialProperty are described in AdaptationSet of texture information of each occlusion image.

Then, one EssentialProperty describes the selection information flag and the selection information value shown in FIG. 13, and another EssentialProperty describes the selection information flag and the selection information value shown in FIG. 17.

In a case where the MPD file thus includes the selection information flag and the selection information value shown in FIG. 13 and the selection information flag and the selection information value shown in FIG. 17, the following process is performed in the file generation apparatus 11 and the client device 71.

In other words, in the file generation apparatus 11, in step S13 in the upload process of FIG. 7, the MPD file generation unit 33 generates an MPD file in which AdaptationSet of texture information of each occlusion image includes a selection information flag and a selection information value of those occlusion images.

At this time, AdaptationSet of texture information of each occlusion image is provided with EssentialProperty describing the selection information flag and the selection information value shown in FIG. 13, and EssentialProperty describing the selection information flag and the selection information value shown in FIG. 17.

<Description of Selection Order List Generation Process>

Figure 18:
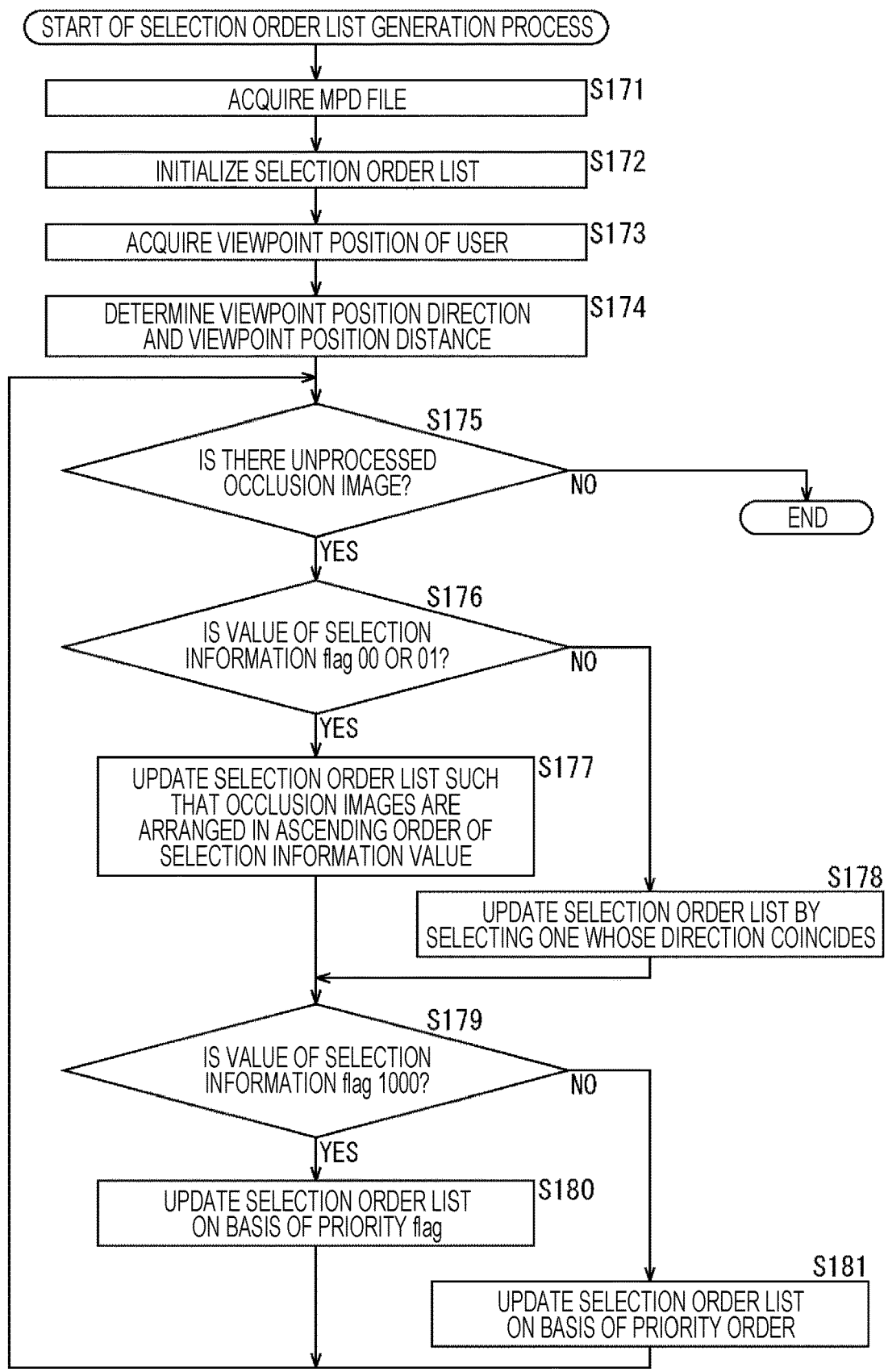
FIG. 18 is a flowchart for explaining the selection order list generation process.

Furthermore, in the client device 71, the selection order list generation process shown in FIG. 18 is performed to generate a selection order list.

Hereinafter, a selection order list generation process by the client device 71 will be described with reference to the flowchart in FIG. 18.

Note that, since the process of step S171 to step S178 is similar to the process of step S141 to step S148 of FIG. 15, the description thereof is omitted.

Note that, in steps S176 to S178, the process is performed with use of the selection information flag and the selection information value shown in FIG. 13 in the MPD file.

When the process of step S177 or step S178 is performed, in step S179, the MPD file processing unit 93 determines whether or not a value of the selection information flag of the occlusion image to be processed in the MPD file is "1000".

Here, a determination process is performed on the basis of a value of the selection information flag described in another EssentialProperty that is included in AdaptationSet of texture information of an occlusion image to be processed and is different from EssentialProperty describing the selection information flag used in step S176. In this case, a value of the selection information flag is either "1000" or "1001".

In a case where it is determined in step S179 that the value of the selection information flag is "1000", in other words, in a case where the priority flag is described as the selection information value in a value of value, the process proceeds to step S180.

In step S180, on the basis of the priority flag of the occlusion image to be processed, which is included in the MPD file, the MPD file processing unit 93 further updates the selection order list obtained in step S177 or step S178.

For example, it is assumed that there is a plurality of occlusion images having same depth level information or depth average value information when the process of step S177 is performed. In this case, the MPD file processing unit 93 updates the selection order list such that a selection order of one whose priority flag is "1" is a higher selection order than a selection order of one whose priority flag is "0", among the plurality of these occlusion images.

Similarly, also in a case where step S178 is performed to obtain the selection order list, there may be a plurality of occlusion images whose direction indicated by the occlusion direction information coincides with the viewpoint position direction, or there may be a plurality of occlusion images having a same difference between a distance indicated by the occlusion distance information and the viewpoint position distance in some cases. In such a case, in step S180, the selection order list is updated such that a selection order of one whose priority flag is "1" is a higher selection order than a selection order of one whose priority flag is "0", among the plurality of these occlusion images.

When the process of step S180 is performed to update the selection order list, thereafter, the process returns to step S175, and the above-described process is repeated.

Furthermore, in a case where it is determined in step S179 that a value of the selection information flag is not "1000", in other words, in a case where a value of the selection information flag is "1001" and the priority order is described as the selection information value in a value of value, the process proceeds to step S181.

In step S181, on the basis of the priority order of the occlusion image to be processed, which is included in the MPD file, the MPD file processing unit 93 further updates the selection order list obtained in step S177 or step S178.

In step S181, similarly to a case of step S180, in a case where there is a plurality of occlusion images for which the selection order cannot be determined, that is, the selection order is to be the same, such as a case where the selection information value is the same in step S177 or step S178, the selection order list is updated such that those occlusion images are arranged in the priority order. In other words, the selection order of occlusion images having a lower priority order is made smaller.

When the process of step S181 is performed to update the selection order list, thereafter, the process returns to step S175, and the above-described process is repeated.

As described above, the client device 71 generates the selection order list by also using the priority flag and the priority order as the selection information value. By generating the selection order list in this manner, the client device 71 can select and acquire a suitable occlusion image even in a case where the transmission band is not sufficient.

Note that, in the above, an example has been described in which the priority flag, the priority order, the depth level information, and the like are signaled with different EssentialProperty. However, in the MPEG-DASH, these pieces of information may be signaled with one same EssentialProperty.

In such a case, for example, it is only required to determine the selection information flag and the selection information value as shown in FIG. 19.

In the example shown in FIG. 19, in a case where a value of the selection information flag is "000", the selection information value is set to be depth level information (depth level) and a priority flag. In other words, in a case where a value of the selection information flag is "000", the depth level information and the priority flag are transmitted to the client device 71. In this case, in value of EssentialProperty, the depth level information and the priority flag are described while being separated by a space.

Furthermore, in a case where a value of the selection information flag is "001", the selection information value is to be the depth level information and the priority order, and in value of EssentialProperty, the depth level information and the priority order are described while being separated by a space.

Note that, also in the following description, when two or more selection information values are described in value, those selection information values are described while being separated by a space.

In a case where a value of the selection information flag is "010", the selection information value is to be the depth average value information (depth average value) and the priority flag, and in a case where a value of the selection information flag is "011", the selection information value is to be the depth average value information and the priority order.

In a case where a value of the selection information flag is "100", the selection information value is to be the occlusion direction information and the priority flag, and in a case where a value of the selection information flag is "101", the selection information value is to be the occlusion direction information and the priority order.

Moreover, in a case where a value of the selection information flag is "110", the selection information value is to be the occlusion direction information, the occlusion distance information, and the priority flag. In a case where a value of the selection information flag is "111", the selection information value is to be the occlusion direction information, the occlusion distance information, and the priority order.

Also in a case where the priority flag and the priority order are thus signaled with one EssentialProperty together with depth level information and the like, a process similar to the selection order list generation process described with reference to FIG. 18 is performed.

However, in this case, in step S176, it is determined whether or not a value of the selection information flag is "000", "001", "010", or "011", and in a case where it is determined to be "000", "001", "010", or "011", the process of step S177 is performed.

Whereas, in a case where it is determined that the value of the selection information flag is not "000", "001", "010", or "011", that is, the value of the selection information flag is "100", "101", "110", or "111", the process of step S178 is performed.

Moreover, in step S179, it is determined whether or not a value of the selection information flag is "000", "010", "100", or "110", and in a case where it is determined to be "000", "010", "100", or "110", the process of step S180 is performed.

On the other hand, in a case where it is determined that the value of the selection information flag is "001", "011", "101", or "111", the process of step S181 is performed.

As described above, even when there is a plurality of occlusion images having a same selection order, it is possible to determine the selection order of those occlusion images by using the priority flag and the priority order.

Furthermore, a content creator can also intentionally designate the selection order of the occlusion image if a mechanism to signal the priority flag and the priority order is used. For example, an occlusion image including an occlusion region that the content creator desires to show to the user may be preferentially acquired, to be used as a recommendation at a time of looking-in display.

Fourth Embodiment

<About Out-of-Display-Range Notification>

Meanwhile, when displaying a full spherical image, when a viewpoint position of the user is too far from a position (origin O') of an occlusion image, occlusion region information necessary for display may not be obtained in some cases. When such occlusion region information that cannot be obtained increases, a region of a portion that cannot be displayed in the full spherical image for display will increase.

In this case, for an occlusion image at a position other than the origin O, as a distance between a viewpoint position of the user and a position where there is the occlusion image is longer, that is, as the viewpoint position of the user moves away from the position of the occlusion image, the region of the portion that cannot be displayed increases.

For example, for a region that cannot be displayed in the full spherical image, that is, an occlusion region for which information cannot be obtained, a black image is to be displayed, or an image of a nearby region is to be duplicated and displayed.

Thus, in a case where the region that cannot be displayed increases in the full spherical image for display, whether to continue displaying the full spherical image or to perform some display to notify that the viewpoint position cannot be moved further is changed depending on the implementation of the client device 71.

However, there may be a case where the content creator does not desire the viewpoint position of the user to move away from the origin O more than expected, since sense of discomfort occurs in displaying the full spherical image.

Therefore, in order to prevent display of the full spherical image with, as the viewpoint position, a position further away from the viewpoint position assumed by the content creator, it is possible indicate, for each occlusion image, a viewpoint position to which the occlusion image is valid.

In a case of signaling information indicating a range of a region where the occlusion image is valid, that is, information indicating a valid distance from the origin O, to the client device 71 side, for example, a selection information flag can be used as shown in FIG. 20.

In the example shown in FIG. 20, in a case where a value of the selection information flag is "10000", the selection information value is to be viewpoint position maximum value information.

Here, the viewpoint position maximum value information is information indicating a maximum value of a distance from the origin O in which suitable display using the occlusion image is possible, to a viewpoint position of the user. In other words, the viewpoint position maximum value information is information indicating a range of the viewpoint position of the user in which the occlusion image can be validly used.

In other words, in a case of using an occlusion image, it is not desired to display a full spherical image using an occlusion image with a viewpoint position where a distance from the origin O to the viewpoint position of the user is longer than a distance indicated by the viewpoint position maximum value information.

Here, a case of actually performing signaling of the viewpoint position maximum value information with use of the selection information flag in the MPEG-DASH will be described.

In such a case, for example, in AdaptationSet of texture information of an occlusion image in the MPD file shown in FIG. 4 and the like, schemeIdUri is set to "urn:mpeg:dash:occlusion:2017", and the selection information flag and the selection information value shown in FIG. 20 are described in a value of value thereof.

Specifically, the values of value are separated by a comma to be "selection information flag, selection information value". For example, in a case where a value of the selection information flag is "10000" and a distance indicated by the viewpoint position maximum value information is 1.0 m, a portion of EssentialProperty is set to be <EssentialProperty schemeIdUri="urn:mpeg:dash:occlusion:2017" value="10000, 1.0">.

In this case, when a viewpoint position of the user is within a distance of 1.0 m from the origin O, although there is no inconvenience in displaying the full spherical image using the occlusion image, it is not desired that the viewpoint position of the user be a position farther than 1.0 m from the origin O.

Note that, needless to say that the viewpoint position maximum value information can be signaled simultaneously with the depth level information, the depth average value information, the occlusion direction information, the occlusion distance information, the priority flag, the priority order, and the like described above. In such a case, that is, in a case of signaling the viewpoint position maximum value information simultaneously with other information, for example, it is only required to provide EssentialProperty for each piece of information to be signaled to AdaptationSet of the texture information of the occlusion image.

In a case where the MPD file thus includes the viewpoint position maximum value information for each occlusion image, in step S13 of FIG. 7, the MPD file generation unit 33 generates an MPD file in which the viewpoint position maximum value information of each occlusion image is described in value as the selection information value.

Furthermore, for example, in the selection order list generation process described with reference to FIGS. 9, 15, and 18, the viewpoint position maximum value information is also used to generate the selection order list.

In other words, the MPD file processing unit 93 determines a distance from the origin O to a viewpoint position of the user as the viewpoint position distance, on the basis of the viewpoint position of the user at a time point of performing the selection order list generation process, that is, at the current time.

Then, the MPD file processing unit 93 generates the selection order list excluding, among one or more occlusion images indicated by the MPD file, one whose distance indicated by the viewpoint position maximum value information is shorter than the viewpoint position distance.

With this operation, only the occlusion image satisfying the condition that the distance indicated by the viewpoint position maximum value information is equal to or more than the viewpoint position distance is used to generate the selection order list.

In other words, in all the occlusion images, occlusion images to be acquired are sequentially selected from among occlusion images whose viewpoint position of the user is a position within a range determined by a distance indicated by the viewpoint position maximum value information.

Therefore, for example, when the selection order list generation process shown in FIG. 9 is performed, the MPD file processing unit 93 determines the viewpoint position distance in step S43.

Then, in steps S44 to S46, only the occlusion image whose distance indicated by the viewpoint position maximum value information is equal to or more than the viewpoint position distance is targeted, and the selection order list is generated. That is, the selection order list is not to include information regarding an occlusion image whose distance indicated by the viewpoint position maximum value information is less than the viewpoint position distance.

Doing like this allows only usable occlusion images to be acquired, to generate a full spherical image for display.

Furthermore, for example, when the selection order list generation process shown in FIG. 18 is performed, the viewpoint position distance calculated in step S174 is used to generate the selection order list. In other words, in steps S175 to S181, only the occlusion image whose distance indicated by the viewpoint position maximum value information is equal to or more than the viewpoint position distance is targeted, and the selection order list is generated.

Moreover, in a case where there is no usable occlusion image, that is, there is no occlusion image whose distance indicated by the viewpoint position maximum value information is equal to or more than the viewpoint position distance, display information indicating that the viewpoint position of the user is out of the display range may be presented to the user.

In such a case, for example, in the selection order list generation process described with reference to FIGS. 9, 15, and 18, when there is no occlusion image whose distance indicated by the viewpoint position maximum value information is equal to or more than the viewpoint position distance, the MPD file processing unit 93 notifies the display information generation unit 113 of the fact.

Then, in response to the notification from the MPD file processing unit 93, the display information generation unit 113 generates an out-of-display-range notification to display that the viewpoint position of the user is out of the range that allows a suitable full spherical image (content) to be displayed, for example, in step S113 of the reproduction process of FIG. 11. Then, the display information generation unit 113 supplies (outputs) the out-of-display-range notification to the display unit 97 to display.

In step S114, the display unit 97 displays the out-of-display-range notification supplied from the display information generation unit 113. At this time, the out-of-display-range notification may be displayed simultaneously with a full spherical image, or only the out-of-display-range notification may be displayed without the full spherical image displayed.

By displaying the out-of-display-range notification in this manner, the user can grasp that the own viewpoint position is too far from the origin O.

Note that, here, an example has been described in which the selection information flag of the viewpoint position maximum value information is different from a selection information flag of depth level information and the like and a selection information flag of a priority flag and the like. However, for example, together with the selection information value shown in FIG. 13 and the selection information value shown in FIG. 19, it is also possible to simultaneously signal the viewpoint position maximum value information as the selection information value.

For example, in a case of simultaneously signaling the viewpoint position maximum value information as the selection information value together with the selection information value shown in FIG. 13, it is only required to determine the selection information flag and the selection information value as shown in FIG. 21.

In the example shown in FIG. 21, in a case where a value of the selection information flag is "10000", the selection information value is to be the depth level information (depth level) and the viewpoint position maximum value information. In other words, in a case where a value of the selection information flag is "10000", the depth level information and the viewpoint position maximum value information are transmitted to the client device 71. In this case, in value of EssentialProperty, the depth level information and the viewpoint position maximum value information are described while being separated by a space.

Furthermore, in a case where a value of the selection information flag is "10001", the selection information value is to be the depth average value information (depth average value) and the viewpoint position maximum value information. Further, in value of EssentialProperty, the depth average value information and the viewpoint position maximum value information are described while being separated by a space.

Note that, also in the following description, when two or more selection information values are described in value, those selection information values are described while being separated by a space.

In a case where a value of the selection information flag is "10010", the selection information value is to be the occlusion direction information and the viewpoint position maximum value information. In a case where a value of the selection information flag is "10011", the selection information value is to be the occlusion direction information, the occlusion distance information, and the viewpoint position maximum value information.

Also in a case of thus signaling the viewpoint position maximum value information together with the depth level information, the depth average value information, the occlusion direction information, and the occlusion distance information, a process similar to the selection order list generation process described with reference to FIG. 15 is performed.

However, in this case, in step S146, it is determined whether or not a value of the selection information flag is "10000" or "10001", and in a case where it is determined as "10,000" or "10001", the process of step S147 is performed.

Whereas, in a case where it is determined that the value of the selection information flag is not "10000" or "10001", that is, the value of the selection information flag is "10010" or "10011", the process of step S148 is performed.

Note that, in steps S147 and S148, only the occlusion image whose distance indicated by the viewpoint position maximum value information is equal to or more than the viewpoint position distance is targeted, and a selection order list is generated. Furthermore, when there is no occlusion image whose distance indicated by the viewpoint position maximum value information is equal to or more than the viewpoint position distance, the MPD file processing unit 93 notifies the display information generation unit 113 of the fact.

As described above, if the viewpoint position maximum value information has been determined for each occlusion image, it becomes possible to select a suitable occlusion image in the client device 71. In other words, in the client device 71, it is possible to select an occlusion image whose viewpoint position distance does not exceed a distance indicated by the viewpoint position maximum value information.

Furthermore, for example, on the content creator side, it is possible to indicate, to the client device 71, a viewpoint position of the user that allows display of the full spherical image with use of an occlusion image. In other words, by displaying the out-of-display-range notification, it is possible to guide the user to view the full spherical image at a suitable viewpoint position.

Fifth Embodiment

<About Signaling of Priority Flag and Priority Order>

Note that the priority flag and the priority order indicating the priority of the occlusion image described in the third embodiment may change in a time direction depending on details of a content.

For example, in a case of setting such a priority flag that gives priority to an occlusion image of a body (object) with a high degree of attention, when the body moves, the occlusion image associated with that body also changes. Therefore, it is assumed that an occlusion image for which a value of the priority flag is desired to be "1" also changes with a time period.

Thus, the priority flag and the priority order of each occlusion image may change with a time period. However, as described in the third embodiment, in a case where the priority flag and the priority order are described in the MPD file as the selection information value, it is difficult to cope with temporal changes in the priority flag and the priority order.

Therefore, for example, by transmitting (signaling) the priority flag and the priority order as Quality information of an international organization for standardization (ISO) base media file format, it may be made possible to cope with temporal changes in the priority flag and the priority order.

For example, since the priority flag and the priority order are used to generate a full spherical image for display, and are information regarding the quality of the full spherical image that is the content to be reproduced, it can be said as Quality information.

As a technique of transmitting different Quality information at a plurality of times, there is a technique indicated by ISO/international electrotechnical commission (IEC) 23001-10.

In ISO/IEC 23001-10, Quality information can be stored in a segment file by using the ISO base media file format. In other words, in ISO/IEC 23001-10, for example, as shown in FIG. 22, QualityMetricsSampleEntry is defined in a segment file (MP4 file).

Then, each Sample (sample) of the segment file includes Quality information of a size indicated by field_size_bytes, a type indicated by metric_code, and a number of pieces of metric_count. Note that Sample corresponds to a frame of the full spherical image. That is, the segment file includes Quality information of an occlusion image for each frame of the full spherical image.

Here, in a current state, field_size_bytes, metric_count, and metric_code are as shown in FIG. 23.

In other words, field_size_bytes indicates magnitude (size) per one of Quality information (one piece of Quality information) included in Sample, while metric_count indicates the number of pieces of the stored Quality information. Furthermore, metric_code indicates a type of the stored Quality information.

Thus, on the basis of the technique of transmitting Quality information, by enabling the priority flag and the priority order of the occlusion image to be signaled with metric_code as a new type of Quality information, it becomes possible to use the priority flag and the priority order determined for each frame (Sample) of the moving image as the full spherical image, that is, for each time.

In this case, metric_code indicating the priority flag and the priority order can be determined, for example, as shown in FIG. 24.

In the example shown in FIG. 24, in a case where metric_code is "ocpf", a priority flag described in 8 bits is stored as Quality information. Also, in this case, when a value of the priority flag is "1", it indicates that the occlusion image should be selected preferentially, and when the value of the priority flag is "0", it indicates that the occlusion image is not to be selected preferentially.

Furthermore, in a case where metric_code is "ocpn", the priority order, which is unsigned 8-bit data, is stored as Quality information.

It can be said that metric_code indicating these "ocpf" and "ocpn" is identification information indicating a type of information regarding the priority of the occlusion image, such as the priority flag and the priority order.

As a specific example, for example, in a case of the use case U1 described above, an MPD file to which the present technology is applied corresponding to the MPD file shown in FIG. 4 is to be as shown in FIG. 25. Note that, in FIG. 25, a description of a portion corresponding to a case in FIG. 4 is to be omitted suitably since it becomes repetition.

The MPD file shown in FIG. 25 differs from the MPD file shown in FIG. 4 only in portions indicated by arrows Q51 and Q52. In other words, in this MPD file, an ISO base media file (segment file) including a Quality value (Quality information) is designated by AdaptationSet for each occlusion image.

In FIG. 25, a portion indicated by arrow Q51 is AdaptationSet for the priority of an occlusion image 1, that is, for Quality information regarding the priority flag and the priority order.

In this AdaptationSet, "ocpn" is described in a portion of codecs as metric_code shown in FIG. 24. This description shows that the segment file of Quality information for the occlusion image 1 corresponding to this AdaptationSet includes the priority order. That is, it is made possible to signal metric_code indicating the priority flag or the priority order with the portion of codecs.

Furthermore, in this AdaptationSet, associationId is set in Representation such that a relationship (association) with texture information of the occlusion image 1 can be grasped. Here, id "vot1" of the texture information of the occlusion image 1 is used for associationId of Representation, and associationId="vot1" is described. This description shows that the Quality information corresponding to this AdaptationSet relates to the occlusion image 1.

Similarly to the portion indicated by arrow Q51, a portion indicated by arrow Q52 is also to be AdaptationSet for Quality information regarding the priority of an occlusion image. In this portion, from "ocpn" in codecs portion and associationId="vot2" in Representation, it can be seen that this AdaptationSet is AdaptationSet for Quality information regarding an occlusion image 2, and the segment file of Quality information includes the priority order and the like.

Note that, here, although an example has been described in which AdaptationSet for Quality information is added to the MPD file and the like shown in FIG. 4, needless to say that AdaptationSet for Quality information may be added to the MPD file shown in FIG. 14.

Furthermore, here, an example will be described in which the priority flag and the priority order are prepared for each frame of a full spherical image, that is, for each frame of an occlusion image. In other words, an example will be described in which the priority flag and the priority order are determined for each frame with one frame as a time unit. However, these priority flag and priority order can be prepared for each of any time unit such as every several frames (for example, every segment).

<Description of Selection Order List Generation Process>

In a case of signaling metric_code with an MPD file in this way, after acquiring the MPD file, the client device 71 acquires a segment file storing Quality information of each occlusion image.

With this operation, the client device 71 can obtain Quality information regarding the priority of each occlusion image, that is, the priority flag or the priority order, for each frame, and can generate a selection order list by using the priority flag or the priority order thus obtained.

In a case of signaling metric_code with an MPD file, in the file generation apparatus 11, in step S12 of the upload process described with reference to FIG. 7, the segment file generation unit 43 also generates a segment file storing Quality information of each occlusion image. This segment file includes the priority flag or the priority order as Quality information. Furthermore, in step S13, the MPD file generation unit 33 generates an MPD file including AdaptationSet that describes metric_code of Quality information of each occlusion image.

Figure 26:
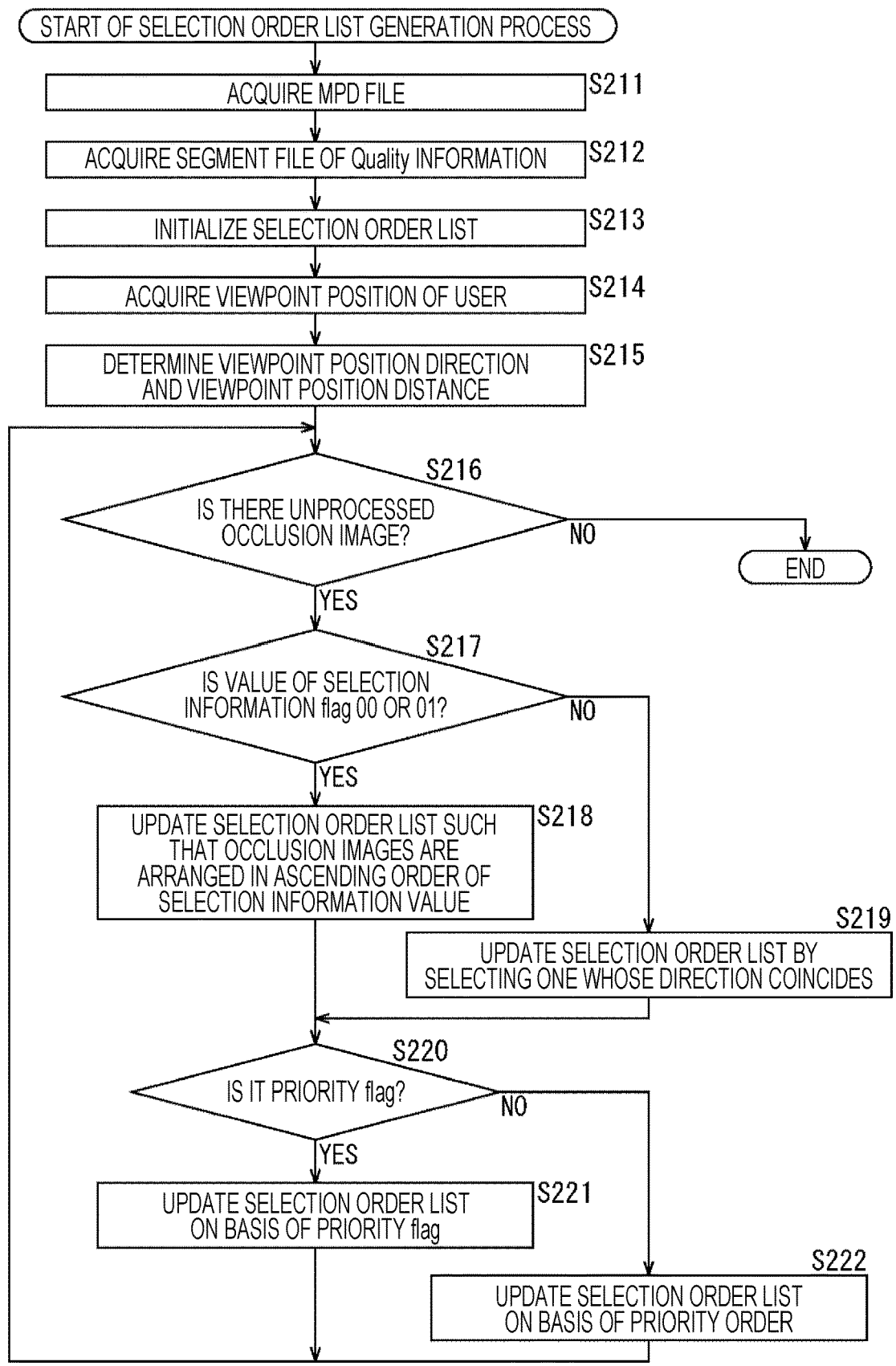
FIG. 26 is a flowchart for explaining the selection order list generation process.

Moreover, in the client device 71, the selection order list generation process shown in FIG. 26 is performed. In other words, the selection order list generation process by the client device 71 will be described below with reference to the flowchart in FIG. 26.

Note that, since the process of step S211 is similar to the process of step S171 in FIG. 18, the description thereof is omitted. However, the MPD file acquired here also includes metric_code of Quality information of each occlusion image, in addition to the selection information flag and the selection information value shown in FIG. 13.

When the MPD file is acquired, on the basis of the acquired MPD file, the MPD file processing unit 93 instructs the segment file acquisition unit 94 to acquire a segment file storing Quality information of each occlusion image.

In step S212, the segment file acquisition unit 94 acquires the segment file storing Quality information of each occlusion image from a server via a network in accordance with the instruction of the MPD file processing unit 93, and supplies to the segment file processing unit 111.

With this operation, a segment file storing the priority flag or the priority order is considered to be acquired as Quality information, which is information regarding the quality of the content, that is, the full spherical image.

The segment file processing unit 111 extracts Quality information in each frame (each time) for each occlusion image from the segment file supplied from the segment file acquisition unit 94, and supplies to the MPD file processing unit 93.

With metric_code of each occlusion image described in the MPD file, the MPD file processing unit 93 can specify whether the Quality information supplied from the segment file processing unit 111 is the priority flag or is the priority order.

When the process of step S212 is performed, thereafter, the processes of steps S213 to S219 are performed. However, since these processes are similar to the processes of steps S172 to S178 in FIG. 18, the description thereof is omitted.

When the process of step S218 or step S219 is performed, in step S220, the MPD file processing unit 93 determines whether or not the Quality information obtained from the segment file is the priority flag.

In a case where it is determined in step S220 as being the priority flag, the process proceeds to step S221. Then, in step S221, a process similar to step S180 in FIG. 18 is performed. Thereafter, the process returns to step S216, and the above-described process is repeatedly performed.

On the other hand, in a case where it is determined in step S220 as being not the priority flag, that is, as being the priority order, the process proceeds to step S222. Then, in step S222, a process similar to step S181 in FIG. 18 is performed. Thereafter, the process returns to step S216, and the above-described process is repeatedly performed.

Note that, since the Quality information is obtained for each frame for each occlusion image in step S212, the processes of steps S213 to S222 are performed for each frame of the occlusion image, that is, for each frame of the full spherical image. In this case, a selection order list is generated for each frame, and a process is to be performed with use of the selection order list obtained for each frame in the file acquisition process described with reference to FIG. 10, which is to be performed thereafter. Furthermore, the processes of steps S213 to S222 may be performed for each segment including a plurality of frames.

As described above, the client device 71 acquires Quality information in advance, and generates a selection order list on the basis of the acquired Quality information. Doing like this makes it possible to select a more suitable occlusion image corresponding to temporal changes in the priority flag and the priority order.

<Modification 1 of Fifth Embodiment>
<About Signaling of Priority Flag and Priority Order>

Note that, in the fifth embodiment, an example has been described in which the priority flag and the priority order of each frame are stored in the segment file as Quality information. However, the priority flag and the priority order of each time may be described in the MPD file.

In the fifth embodiment described above, it is necessary to obtain a segment file of the ISO base media file format and obtain Quality information from the segment file, which causes complication of the processing.

Therefore, by describing the priority flag and the priority order of each time directly in the MPD file, although the size of the MPD file becomes large, the priority flag and the priority order of each time can be obtained from only the MPD file.

For example, in a case of describing the priority flag and the priority order of each time in the MPD file, the number of segments or subsegments with a valid selection information value are to be described, in addition to a selection information flag and a selection information value.

Specifically, for example, in AdaptationSet for the priority flag and the priority order, schemeIdUri of EssentialProperty is set to "urn:mpeg:dash:occlusion-dynamic:2017", and the selection information flag, the selection information value, and the number of segments (or subsegments) are described in a value of value thereof.

At this time, the value of value is separated by a comma to be "the selection information flag, the selection information value, the number of segments (or subsegments)".

Here, the number of segments (or subsegments) described in value, that is, included in value, is information indicating the number of segments (or subsegments) that form a period in which one same priority flag or priority order is used and include one or more frames. In other words, the number of segments (or subsegments) included in value is information indicating a period including one or more segments (or subsegments) in which one same priority flag or priority order is used.

By setting a plurality of pieces of such EssentialProperty in AdaptationSet, the priority flag or the priority order can be designated as the selection information value, for example, for each period (time period) including one or more segments (or subsegments). Note that, here, the selection information flag and the selection information value are to be as shown in FIG. 17.

For example, it is assumed that the following three pieces of EssentialProperty are set to AdaptationSet of texture information of a certain occlusion image.

<EssentialProperty schemeIdUri="urn:mpeg:dash:occlusion-dynamic:2017" value="1001,2,100">
<EssentialProperty schemeIdUri="urn:mpeg:dash:occlusion-dynamic:2017" value="1001,1,50">
<EssentialProperty schemeIdUri="urn:mpeg:dash:occlusion-dynamic:2017" value="1001,2,70">

In this case, the first EssentialProperty indicates that the first 100 segments (or subsegments) have a priority order of "2", while the second EssentialProperty indicates that the next 50 pieces, that is, the 101st to 150th segments (or subsegments), have a priority order of "1". Moreover, the third EssentialProperty indicates that the further next 70 pieces, that is, the 151st to 220th segments (or subsegments), have a priority order of "2".

Thus, in the MPD file, it is also possible to cope with temporal changes in the priority flag and the priority order and select a suitable occlusion image, by providing EssentialProperty for each period including several segments (frames) and describing the priority flag and the priority order of each time (period).

In such a case, in the file generation apparatus 11, in step S13 of FIG. 7, the MPD file generation unit 33 generates an MPD file that describes EssentialProperty in which value includes the selection information flag and the selection information value shown in FIG. 17 and the number of segments indicating a period.

Furthermore, in the client device 71, a process similar to the selection order list generation process described with reference to FIG. 26 is performed.

However, the priority flag and the priority order in each segment (frame) are read from the MPD file acquired in step S211, without the process of step S212 being performed.

In the fifth embodiment and Modification 1 of the fifth embodiment described above, by simultaneously distributing a priority flag and a priority order as Quality information of the ISO Base media file, and distributing a priority flag and a priority order for each segment (or subsegment) with the MPD file, it becomes possible to change the priority flag and the priority order for each time period. With this operation, the client device 71 can select a suitable occlusion image for each time period.

Furthermore, for example, for an occlusion image according to a viewpoint position of the user at the start of content reproduction, the occlusion image may be stored in an MPD file to be supplied to the client device 71.

In such a case, for example, the client device 71 includes a viewpoint position of the user at the current time, generates a sending request for requesting sending of the MPD file, and sends to the server.

Then, the server that has received the sending request from the client device 71 selects several occlusion images at a position near the viewpoint position of the user included in the sending request, among the plurality of occlusion images being held.

Then, the server generates an MPD file including the selected occlusion image, and sends to the client device 71. Doing like this enables the client device 71 to obtain a suitable occlusion image without selecting an occlusion image on the client device 71 side, immediately after the content reproduction starts. Note that, thereafter, the client device 71 selects an occlusion image in accordance with the technique described in each of the above-described embodiments, and acquires from the server.

Note that the process of generating an MPD file including an occlusion image may be performed by the file generation apparatus 11. In such a case, the upload unit 35 receives a sending request including a viewpoint position, the MPD file generation unit 33 generates an MPD file including an occlusion image, and the upload unit 35 sends the MPD file to the client device 71.

<Configuration Example of Computer>

Meanwhile, the series of processes described above can be executed by hardware or also executed by software. In a case where the series of processes are performed by software, a program that configures the software is installed in a computer. Here, examples of the computer include, for example, a computer that is built in dedicated hardware, a general-purpose personal computer that can perform various functions by being installed with various programs, and the like.

Figure 27:
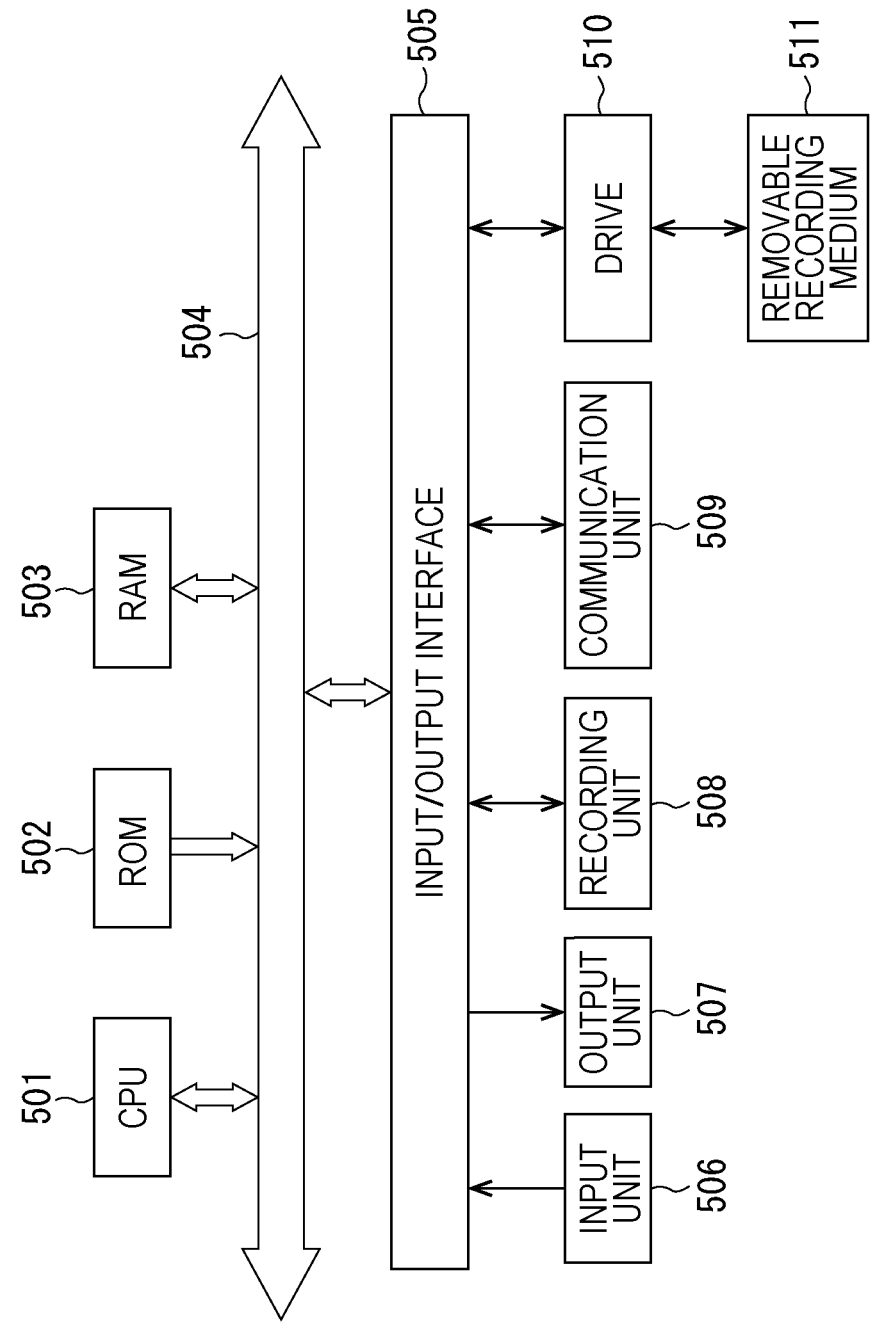
FIG. 27 is a diagram showing a configuration example of a computer.

FIG. 27 is a block diagram showing a configuration example of hardware of a computer that executes the series of processes described above in accordance with a program.

In the computer, a central processing unit (CPU) 501, a read only memory (ROM) 502, and a random access memory (RAM) 503 are mutually connected by a bus 504.

The bus 504 is further connected with an input/output interface 505. To the input/output interface 505, an input unit 506, an output unit 507, a recording unit 508, a communication unit 509, and a drive 510 are connected.

The input unit 506 includes a keyboard, a mouse, a microphone, an imaging element, and the like. The output unit 507 includes a display, a speaker, and the like. The recording unit 508 includes a hard disk, a non-volatile memory, and the like. The communication unit 509 includes a network interface or the like. The drive 510 drives a removable recording medium 511 such as a magnetic disk, an optical disk, a magneto-optical disk, or a semiconductor memory.

In the computer configured as described above, the series of processes described above are performed, for example, by the CPU 501 loading the program recorded in the recording unit 508 into the RAM 503 via the input/output interface 505 and the bus 504, and executing.

The program executed by the computer (CPU 501) can be provided by being recorded on, for example, the removable recording medium 511 as a package medium or the like. Furthermore, the program can be provided via a wired or wireless transmission medium such as a local area network, the Internet, or digital satellite broadcasting.

In the computer, by attaching the removable recording medium 511 to the drive 510, the program can be installed in the recording unit 508 via the input/output interface 505. Furthermore, the program can be received by the communication unit 509 via a wired or wireless transmission medium, and installed in the recording unit 508. Besides, the program can be installed in advance in the ROM 502 and the recording unit 508.

Note that the program executed by the computer may be a program that performs processing in a chronological order according to the order described in this specification, or may be a program that performs processing in parallel or at necessary timing such as when a call is made.

Furthermore, the embodiments of the present technology are not limited to the above-described embodiments, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

Moreover, the present technology can also be configured as follows.

(1)

An image processing apparatus including:

an MPD file processing unit configured to select an occlusion image to be acquired, on the basis of information regarding a viewpoint position of the occlusion image included in an MPD file, from among a plurality of the occlusion images indicated by the MPD file.

(2)

The image processing apparatus according to (1), in which the MPD file processing unit selects the occlusion image of a number according to a transmission band.

(3)

The image processing apparatus according to (1) or (2), further including:

an acquisition unit configured to acquire the occlusion image selected by the MPD file processing unit.

(4)

The image processing apparatus according to any one of (1) to (3), in which the MPD file processing unit selects the occlusion image sequentially from one in which a viewpoint position of the occlusion image is closer to a viewpoint position of a user.

(5)

The image processing apparatus according to any one of (1) to (4), in which the information regarding a viewpoint position of the occlusion image is coordinate information indicating a viewpoint position of the occlusion image.

(6)

The image processing apparatus according to any one of (1) to (4), in which the information regarding a viewpoint position of the occlusion image is direction information indicating a direction of a viewpoint position of the occlusion image viewed from a reference position.

(7)

The image processing apparatus according to (6), in which the information regarding a viewpoint position of the occlusion image is the direction information, and distance information indicating a distance from the reference position to a viewpoint position of the occlusion image.

(8)

The image processing apparatus according to any one of (1) to (7), in which the MPD file processing unit selects the occlusion image on the basis of at least one of: the information regarding a viewpoint position of the occlusion image; or information regarding a depth of the occlusion image included in the MPD file.

(9)

The image processing apparatus according to (8), in which for each of the occlusion images, the MPD file includes: selection information indicating which information is included out of the information regarding a viewpoint position of the occlusion image and the information regarding the depth of the occlusion image; and information indicated by the selection information.

(10)

The image processing apparatus according to any one of (1) to (9), in which the MPD file processing unit selects the occlusion image by further using information regarding a priority of the occlusion image.

(11)

The image processing apparatus according to (10), in which the MPD file processing unit selects the occlusion image for each time by using information regarding a priority of the occlusion image determined for each time.

(12)

The image processing apparatus according to (11), in which for each of the occlusion images, the MPD file includes: information indicating the period; and information regarding a priority of the occlusion image in the period, for each period of a plurality of periods.

(13)

The image processing apparatus according to (11), in which information regarding a priority of the occlusion image is included in a file that stores information regarding a quality of a content to be reproduced using the occlusion image.

(14)

The image processing apparatus according to any one of (1) to (13), in which the MPD file includes viewpoint position information indicating a range of a viewpoint position of a user in which the occlusion image can be used, and the MPD file processing unit selects the occlusion image to be acquired, on the basis of the viewpoint position information, from the occlusion images in which a viewpoint position of the user is within the range among the plurality of the occlusion images.

(15)

The image processing apparatus according to (14), further including:

a display information generation unit configured to generate and output display information indicating that a viewpoint position of the user is outside a display range of a content to be reproduced using the occlusion image, in a case where there are none of the occlusion images in which a viewpoint position of the user is within the range.

(16)

An image processing method including:

a step of selecting an occlusion image to be acquired, on the basis of information regarding a viewpoint position of the occlusion image included in an MPD file, from among a plurality of the occlusion images indicated by the MPD file.

(17)

A program for causing a computer to execute processing including:

a step of selecting an occlusion image to be acquired, on the basis of information regarding a viewpoint position of the occlusion image included in an MPD file, from among a plurality of the occlusion images indicated by the MPD file.

(18)

A file generation apparatus including:

an MPD file generation unit configured to generate an MPD file including information regarding a viewpoint position of an occlusion image for a plurality of the occlusion images; and a communication unit to send the MPD file.

(19)

The file generation apparatus according to (18), in which information regarding a viewpoint position of the occlusion image is coordinate information indicating a viewpoint position of the occlusion image.

(20)

The file generation apparatus according to (18), in which information regarding a viewpoint position of the occlusion image is direction information indicating a direction of a viewpoint position of the occlusion image viewed from a reference position.

(21)

The file generation apparatus according to (20), in which information regarding a viewpoint position of the occlusion image is the direction information, and distance information indicating a distance from the reference position to a viewpoint position of the occlusion image.

(22)

The file generation apparatus according to any one of (18) to (21), in which the MPD file includes, for each occlusion, at least one of: information regarding a viewpoint position of the occlusion image; or information regarding a depth of the occlusion image.

(23)

The file generation apparatus according to (22), in which for each of the occlusion images, the MPD file includes: selection information indicating which information is included out of information regarding a viewpoint position of the occlusion image and information regarding a depth of the occlusion image; and information indicated by the selection information.

(24)

The file generation apparatus according to any one of (18) to (23), in which the MPD file includes information regarding a priority of the occlusion image.

(25)

The file generation apparatus according to (24), in which for each of the occlusion images, for each period of a plurality of periods, the MPD file includes: information indicating the period; and information regarding a priority of the occlusion image in the period.

(26)

The file generation apparatus according to any one of (18) to (25), in which the MPD file includes viewpoint position information indicating a range of a viewpoint position of a user in which the occlusion image can be used.

(27)

A file generation method including the steps of: generating an MPD file including information regarding a viewpoint position of an occlusion image for a plurality of the occlusion images; and sending the MPD file.

(28)

A program for causing a computer to execute processing including the steps of:

generating an MPD file including information regarding a viewpoint position of an occlusion image for a plurality of the occlusion images; and sending the MPD file.

REFERENCE SIGNS LIST

11 File generation apparatus
33 MPD file generation unit
35 Upload unit
71 Client device
93 MPD file processing unit
94 Segment file acquisition unit
113 Display information generation unit

The invention claimed is:

1. An image processing apparatus comprising:
an MPD file processing unit configured to select an occlusion image to be acquired, on a basis of information regarding a viewpoint position of the occlusion image included in an MPD file of a main image and information regarding a depth of the occlusion image included in the MPD file, from among a plurality of the occlusion images indicated by the MPD file, wherein a full spherical image reproduced by texture information of the main image comprises an omnidirectional image viewed from an origin in a predetermined coordinate system, the occlusion image comprises texture information of an occlusion region of a second full spherical image viewed from a viewpoint other than the origin, the information regarding the depth of the occlusion image includes information indicating an order of a depth amount of the occlusion region of the occlusion image, the occlusion region comprises texture information of a subject that cannot be obtained from the texture information of the main image viewed from the origin, the information regarding the depth of the occlusion image further includes information indicating a distance in a depth direction corresponding to the subject at each position on the occlusion image, and the MPD file processing unit is implemented via at least one processor.

2. The image processing apparatus according to claim 1, wherein the MPD file processing unit is further configured to select the occlusion image of a number according to a transmission band.

3. The image processing apparatus according to claim 1, further comprising:

an acquisition unit configured to acquire the occlusion image selected by the MPD file processing unit, wherein the acquisition unit is implemented via at least one processor.

4. The image processing apparatus according to claim 1, wherein the MPD file processing unit is further configured to select the occlusion image sequentially from one in which a viewpoint position of the occlusion image is closer to a viewpoint other than the origin.

5. The image processing apparatus according to claim 1, wherein the information regarding a viewpoint position of the occlusion image includes coordinate information indicating a viewpoint position of the occlusion image.

6. The image processing apparatus according to claim 1, wherein the information regarding a viewpoint position of the occlusion image includes direction information indicating a direction of a viewpoint position of the occlusion image viewed from a reference position.

7. The image processing apparatus according to claim 6, wherein the information regarding a viewpoint position of the occlusion image includes the direction information, and distance information indicating a distance from the reference position to a viewpoint position of the occlusion image.

8. The image processing apparatus according to claim 6, wherein the information regarding a viewpoint position of the occlusion image includes occlusion direction information, or occlusion direction information and occlusion distance information.

9. The image processing apparatus according to claim 1, wherein for each occlusion image of the plurality of the occlusion images, the MPD file includes: selection information indicating which information is included out of the information regarding a viewpoint position of the occlusion image and the information regarding the depth of the occlusion image; and information indicated by the selection information.

10. The image processing apparatus according to claim 1, wherein the MPD file processing unit is further configured to select the occlusion image by further using information regarding a priority of the occlusion image.

11. The image processing apparatus according to claim 10, wherein the MPD file processing unit is further configured to select the occlusion image for each time by using information regarding a priority of the occlusion image determined for each time.

12. The image processing apparatus according to claim 11, wherein for each occlusion image of the plurality of the occlusion images, the MPD file includes:

information indicating a period; and information regarding a priority of the occlusion image in the period, for each of a plurality of periods.

13. The image processing apparatus according to claim 11, wherein information regarding a priority of the occlusion image is included in a file that stores information regarding a quality of a content to be reproduced using the occlusion image.

14. The image processing apparatus according to claim 1, wherein the MPD file includes viewpoint position information indicating a range of a viewpoint position of a user in which the occlusion image can be used, and the MPD file processing unit is further configured to select the occlusion image to be acquired, on a basis of the viewpoint position information, from the plurality of the occlusion images in which a viewpoint position of the user is within the range among the plurality of the occlusion images.

15. The image processing apparatus according to claim 14, further comprising:

a display information generation unit configured to generate and output display information indicating that a viewpoint position of the user is outside a display range of a content to be reproduced using the occlusion image, in a case where there are none of the plurality of the occlusion images in which a viewpoint position of the user is within the range, wherein the display information generation unit is implemented via at least one processor.

16. The image processing apparatus according to claim 1, wherein the order of the depth amount is determined based on a sum of depth values at individual positions in a predetermined frame of the texture information the occlusion image.

17. An image processing method comprising:

selecting an occlusion image to be acquired, on a basis of information regarding a viewpoint position of the occlusion image included in an MPD file of a main image and information regarding a depth of the occlusion image included in the MPD file, from among a plurality of the occlusion images indicated by the MPD file, wherein a full spherical image reproduced by texture information of the main image comprises an omnidirectional image viewed from an origin in a predetermined coordinate system, the occlusion image comprises texture information of an occlusion region of a second full spherical image viewed from a viewpoint other than the origin, the information regarding the depth of the occlusion image includes information indicating an order of a depth amount of the occlusion region of the occlusion image, the occlusion region comprises texture information of a subject that cannot be obtained from the texture information of the main image viewed from the origin, and the information regarding the depth of the occlusion image further includes information indicating a distance in a depth direction corresponding to the subject at each position on the occlusion image.

18. A non-transitory computer-readable medium having embodied thereon a program, which when executed by a computer causes the computer to execute an image processing method, the method comprising:

selecting an occlusion image to be acquired, on a basis of information regarding a viewpoint position of the occlusion image included in an MPD file of a main image and information regarding a depth of the occlusion image included in the MPD file, from among a plurality of the occlusion images indicated by the MPD file, wherein a full spherical image reproduced by texture information of the main image comprises an omnidirectional image viewed from an origin in a predetermined coordinate system, the occlusion image comprises texture information of an occlusion region of a second full spherical image viewed from a viewpoint other than the origin, the information regarding the depth of the occlusion image includes information indicating an order of a depth amount of the occlusion region of the occlusion image, the occlusion region comprises texture information of a subject that cannot be obtained from the texture information of the main image viewed from the origin, and the information regarding the depth of the occlusion image further includes information indicating a distance in a depth direction corresponding to the subject at each position on the occlusion image.

19. A file generation apparatus comprising:
an MPD file generation unit configured to generate an MPD file of a main image including information regarding a viewpoint position of an occlusion image and information regarding a depth of the occlusion image for a plurality of the occlusion images; and
a communication unit configured to send the MPD file, wherein a full spherical image reproduced by texture information of the main image comprises an omnidirectional image viewed from an origin in a predetermined coordinate system, the occlusion image comprises texture information of an occlusion region of a second full spherical image viewed from a viewpoint other than the origin, the information regarding the depth of the occlusion image includes information indicating an order of a depth amount of the occlusion region of the occlusion image, the occlusion region comprises texture information of a subject that cannot be obtained from the texture information of the main image viewed from the origin, the information regarding the depth of the occlusion image further includes information indicating a distance in a depth direction corresponding to the subject at each position on the occlusion image, and the MPD file generation unit and the communication unit are each implemented via at least one processor.

20. A file generation method comprising:
generating an MPD file of a main image including information regarding a viewpoint position of an occlusion image and information regarding a depth of the occlusion image for a plurality of the occlusion images; and
sending the MPD file, wherein a full spherical image reproduced by texture information of the main image comprises an omnidirectional image viewed from an origin in a predetermined coordinate system, the occlusion image comprises texture information of an occlusion region of a second full spherical image viewed from a viewpoint other than the origin, the information regarding the depth of the occlusion image includes information indicating an order of a depth amount of the occlusion region of the occlusion image, the occlusion region comprises texture information of a subject that cannot be obtained from the texture information of the main image viewed from the origin, and the information regarding the depth of the occlusion image further includes information indicating a distance in a depth direction corresponding to the subject at each position on the occlusion image.

21. A non-transitory computer-readable medium having embodied thereon a program, which when executed by a computer causes the computer to execute a file generation method, the method comprising:

generating an MPD file of a main image including information regarding a viewpoint position of an occlusion image and information regarding a depth of the occlusion image for a plurality of the occlusion images; and
sending the MPD file, wherein a full spherical image reproduced by texture information of the main image comprises an omnidirectional image viewed from an origin in a predetermined coordinate system, the occlusion image comprises texture information of an occlusion region of a second full spherical image viewed from a viewpoint other than the origin, the information regarding the depth of the occlusion image includes information indicating an order of a depth amount of the occlusion region of the occlusion image, the occlusion region comprises texture information of a subject that cannot be obtained from the texture information of the main image viewed from the origin, and the information regarding the depth of the occlusion image further includes information indicating a distance in a depth direction corresponding to the subject at each position on the occlusion image.

* * * * *